(12) United States Patent
Hirata et al.

(10) Patent No.: US 9,389,524 B2
(45) Date of Patent: *Jul. 12, 2016

(54) POLYCARBONATE COPOLYMER, COATING LIQUID USING SAME, AND ELECTROPHOTOGRAPHIC PHOTORECEPTOR

(71) Applicant: IDEMITSU KOSAN CO., LTD., Chiyoda-ku (JP)

(72) Inventors: Kengo Hirata, Sodegaura (JP); Hironobu Morishita, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/405,595

(22) PCT Filed: Jun. 18, 2013

(86) PCT No.: PCT/JP2013/066728
§ 371 (c)(1),
(2) Date: Dec. 4, 2014

(87) PCT Pub. No.: WO2013/191174
PCT Pub. Date: Dec. 27, 2013

(65) Prior Publication Data
US 2015/0147689 A1 May 28, 2015

(30) Foreign Application Priority Data
Jun. 19, 2012 (JP) ................................. 2012-138085

(51) Int. Cl.
| | | |
|---|---|---|
| *C08G 63/02* | (2006.01) | |
| *G03G 5/07* | (2006.01) | |
| *C08G 64/06* | (2006.01) | |
| *G03G 5/05* | (2006.01) | |
| *C09D 169/00* | (2006.01) | |
| *C08G 64/14* | (2006.01) | |
| *C08G 64/00* | (2006.01) | |

(52) U.S. Cl.
CPC ............... *G03G 5/071* (2013.01); *C08G 64/06* (2013.01); *C08G 64/14* (2013.01); *C09D 169/00* (2013.01); *G03G 5/05* (2013.01); *G03G 5/0525* (2013.01); *G03G 5/0564* (2013.01)

(58) Field of Classification Search
CPC .............................. C08G 64/307; C08G 64/14
USPC .................................................. 528/196, 198
See application file for complete search history.

(56) References Cited

U.S. PATENT DOCUMENTS

| | | | | |
|---|---|---|---|---|
| 8,927,680 B2 * | 1/2015 | Morishita | ............ | G03G 5/0564 264/1.24 |
| 2005/0106483 A1 | 5/2005 | Shoshi et al. | | |
| 2012/0100474 A1 | 4/2012 | Hikosaka et al. | | |
| 2013/0337373 A1 | 12/2013 | Hirata et al. | | |
| 2014/0363760 A1 | 12/2014 | Hirata | | |

FOREIGN PATENT DOCUMENTS

| | | |
|---|---|---|
| CN | 1957017 A | 5/2007 |
| CN | 101445596 A | 6/2009 |
| JP | 04-179961 | 6/1992 |
| JP | 2568352 | 1/1997 |
| JP | 11-172003 | 6/1999 |
| JP | 2005-092136 | 4/2005 |
| JP | 2005-139339 | 6/2005 |
| JP | 2007-536420 | 12/2007 |
| JP | 2011/026574 | 2/2011 |
| JP | 2011-026575 | 2/2011 |
| WO | 2010/150885 | 12/2010 |
| WO | 2012/115088 | 8/2012 |
| WO | 2013/099965 | 7/2013 |

OTHER PUBLICATIONS

International Search Report Issued Sep. 24, 2013 in PCT/JP13/066728 Filed Jun. 18, 2013.
Combined Office Action and Search Report issued Nov. 5, 2015 in Chinese Patent Application No. 201380031765.5 (with English translation and English translation of category of cited documents).

* cited by examiner

*Primary Examiner* — Terressa Boykin
(74) *Attorney, Agent, or Firm* — Oblon, McClelland, Maier & Neustadt, L.L.P.

(57) ABSTRACT

A polycarbonate copolymer includes a repeating unit A represented by a formula (1) below and a repeating unit B represented by a formula (2) below, in which an abundance ratio represented by $Ar^1/(Ar^1+Ar^2)$ is in a range of 35 mol % to 75 mol % and an abundance ratio represented by $Ar^2/(Ar^1+Ar^2)$ is in a range of 25 mol % to 65 mol %,

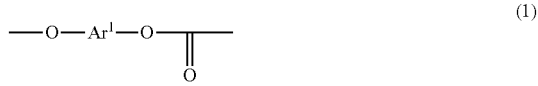

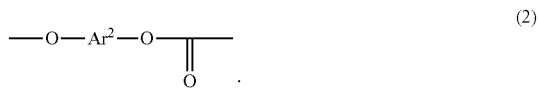

17 Claims, No Drawings

POLYCARBONATE COPOLYMER, COATING LIQUID USING SAME, AND ELECTROPHOTOGRAPHIC PHOTORECEPTOR

TECHNICAL FIELD

The present invention relates to a polycarbonate copolymer, a coating liquid including the polycarbonate copolymer, and an electrophotographic photoreceptor.

BACKGROUND ART

A polycarbonate resin has been used as a material for molded products in various industrial fields because of its excellent mechanical characteristics, thermal characteristics and electrical characteristics. Recently, the polycarbonate resin has often been used in a field of a functional product requiring optical characteristics of the polycarbonate resin as well as the above characteristics. With such an expansion of the field in which the polycarbonate resin is used, required performances of the polycarbonate resin become diversified. Accordingly, not only a conventionally used polycarbonate resin but also a polycarbonate resin having various chemical structures have been proposed.

The functional product is exemplified by an organic electrophotographic photoreceptor in which the polycarbonate resin is used as a binder resin for functional materials such as a charge generating material and a charge transporting material.

Depending on electrophotography process to be applied, the organic electrophotographic photoreceptor is required to have predetermined sensitivity, electrical characteristics and optical characteristics. A surface of a photosensitive layer of the electrophotographic photoreceptor is repeatedly subjected to operations such as corona electrification, toner development, transfer onto papers, cleaning and the like. Electrical and mechanical external-forces are applied on the surface of the photosensitive layer every time such operations are performed. Accordingly, the photosensitive layer provided on the surface of the electrophotographic photoreceptor is required to have durability against these external forces in order to maintain electrophotography image quality for a long period of time. Moreover, since the organic electrophotographic photoreceptor is typically manufactured by dissolving the binder resin as well as the functional material in an organic solvent and film-casting the obtained solvent on a conductive substrate and the like, the binder resin is required to have solubility in the organic solvent and stability of the obtained solvent.

Conventionally, a polycarbonate resin made from 2,2-bis (4-hydroxyphenyl)propane, 2,2-bis(4-hydroxyphenyl)cyclohexane and the like have been used as the binder resin for the electrophotographic photoreceptor. However, such a polycarbonate resin is insufficient in durability. It is conceivable that a possible solution for improving the durability is to improve wear resistance of the photosensitive layer. A polycarbonate copolymer has been known as an effective material for improving the wear resistance of the photosensitive layer (see, for instance, Patent Literatures 1 to 3).

A resin disclosed in Patent Literature 1 includes a polycarbonate copolymer manufactured by copolymerizing a component having a bisphenol Z skeleton that contributes to solubility with a component having a biphenol skeleton that contributes to wear resistance. This polycarbonate copolymer is found to have a wear resistance superior to that of a bisphenol-Z-type polycarbonate homopolymer.

Patent Literatures 2 and 3 each disclose a polycarbonate copolymer obtained by copolymerizing a skeleton derived from an oligomer having a small number of monomer units of a biphenol compound with a biphenol skeleton different from the above biphenol skeleton and having a favorable wear resistance, at a copolymerization ratio from 25 mol % to 50 mol %.

Patent Literatures 4 and 5 each disclose a copolymerized polycarbonate resin having a diphenylether skeleton.

CITATION LIST

Patent Literatures

Patent Literature 1: JP-A-4-179961
Patent Literature 2: JP-A-2011-26574
Patent Literature 3: JP-A-2011-26575
Patent Literature 4: JP-A-2007-536420
Patent Literature 5: Japanese Patent No. 2568352

SUMMARY OF THE INVENTION

Problems to be Solved by the Invention

However, in the aforementioned polycarbonate copolymer disclosed in Patent Literature 1, a content of the biphenol component, which contributes to improvement in wear resistance, is approximately 23 mol % at most, because oligomers (material) having a chloroformate group at a molecule end are specifically a dimer, a trimer and a tetramer. In order to increase the content of the biphenol component, an attempt has been made to manufacture an oligomer of biphenol by the method described in Patent Literature 1. However, an undissolved component is deposited to cause failure in synthesis of the oligomer. Moreover, when a bisphenol Z monomer and biphenol are mixed to manufacture a polycarbonate copolymer, a solution in which the obtained polycarbonate copolymer is dissolved is unfavorably whitened.

In recent years, the organic electrophotographic photoreceptor is desired to have a high durability. Also in the organic electrophotographic photoreceptor including the polycarbonate copolymer disclosed in Patent Literatures 2 and 3, a further improvement in wear resistance is desired.

Patent Literature 4 discloses use of the above polycarbonate copolymer for melt-molding, but is silent on a use of the polycarbonate copolymer for coating and wear resistance thereof. Moreover, in Examples of Patent Literature 4, in the polycarbonate resin in which the diphenylether skeleton and the biphenol skeleton are copolymerized and the polycarbonate resin in which a bisphenol A skeleton is used in place of biphenol, it is conceivable that wear resistance, solubility, transparency, electrical characteristics and the like are poor because of structures and manufacturing methods thereof.

In the organic electrophotographic photoreceptor including the polycarbonate copolymer having the diphenylether skeleton disclosed in Patent Literature 5, as a content of the diphenylether skeleton is increased, due to the manufacturing method, the diphenylether skeleton is likely to be formed in a double chain structure or a triple chain structure, so that it is expected that the solubility, transparency, electrical characteristics and mechanical characteristics are likely to be lowered.

An object of the invention is to provide: a polycarbonate copolymer exhibiting excellent wear resistance and solubility in an organic solvent; a coating liquid including the polycarbonate copolymer; and an electrophotographic photoreceptor including the polycarbonate copolymer or the coating liquid, the electrophotographic photoreceptor exhibiting an excellent wear resistance and being unlikely to be mechanically deteriorated.

Means for Solving the Problems

After the dedicated study to solve the above problems, the inventors found that a polycarbonate copolymer having an extremely high wear resistance is obtainable by designing an optimum composition of a repeating unit including a group derived from dihydroxydiphenylether and a repeating unit including a specific group. Moreover, the inventors found that use of the oligomer having a small number of monomer units as a material inhibits crystallization of the diphenylether skeleton, thereby providing the polycarbonate copolymer having an excellent solution stability and inhibiting whitening of a solution. The invention is completed based on this finding.

Specifically, the invention provides a polycarbonate copolymer, a coating liquid including the polycarbonate copolymer, and an electrophotographic photoreceptor, as described below.

According to an aspect of the invention, a polycarbonate copolymer includes a repeating unit A represented by a formula (1) below and a repeating unit B represented by a formula (2) below, in which an abundance ratio of $Ar^1/(Ar^1+Ar^2)$ is in a range of 35 mol % to 75 mol % and an abundance ratio of $Ar^2/(Ar^1+Ar^2)$ is in a range of 25 mol % to 65 mol %.

[Formula 1]

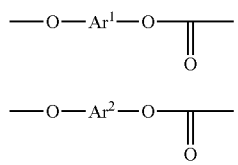

In the formulae, $Ar^1$ is a group represented by a formula (3) below and $Ar^2$ is a group represented by a formula (4) below.

[Formula 2]

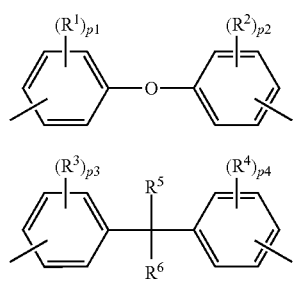

In the formulae (3) and (4), $R^1$ to $R^4$ each are a fluoroalkyl group having 1 to 5 carbon atoms, an alkyl group having 1 to 5 carbon atoms, or an alkoxy group having 1 to 5 carbon atoms.

$R^5$ to $R^6$ each are a hydrogen atom or an alkyl group having 1 to 2 carbon atoms.

$p_1$ to $p_4$ each are an integer of 0 to 4. When an aromatic ring is substituted by two or more of $R^1$ to $R^4$ ($p_1$ to $p_4 \geq 2$), the two or more of $R^1$ to $R^4$ are mutually the same or different.

$R^5$ to $R^6$ are mutually different.

In the polycarbonate copolymer according to the above aspect of the invention, a chain end of each of the repeating units represented by the formulae (1) and (2) is preferably terminated by a monovalent aromatic group or a monovalent fluorine-containing aliphatic group.

In the polycarbonate copolymer according to the above aspect of the invention, the polycarbonate copolymer is preferably made from at least one of bischloroformate oligomers represented by formulae (13) and (14) below, the at least one of bischloroformate oligomers having an average number of monomer unit (n) in a range of 1.0 to 1.99.

[Formula 3]

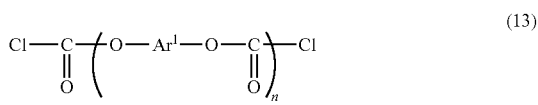

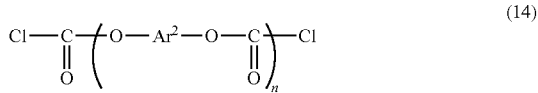

In the polycarbonate copolymer according to the above aspect of the invention, the group represented by the formula (4) is preferably a divalent group derived from 2,2-bis(4-hydroxyphenyl)butane.

According to another aspect of the invention, a coating liquid contains the above-described polycarbonate copolymer and an organic solvent.

According to still another aspect of the invention, an electrophotographic photoreceptor includes: a conductive substrate; and a photosensitive layer on the conductive substrate, in which the photosensitive layer contains the above-described polycarbonate copolymer as a component.

The above aspects of the invention can provide a polycarbonate copolymer exhibiting excellent wear resistance and solubility to an organic solvent, a coating liquid including the polycarbonate copolymer, and an electrophotographic photoreceptor including the polycarbonate copolymer or the coating liquid, the electrophotographic photoreceptor exhibiting an excellent wear resistance and being unlikely to be mechanically deteriorated.

DESCRIPTION OF EMBODIMENT(S)

A polycarbonate copolymer (hereinafter, also simply referred to as a "PC copolymer") in an exemplary embodiment of the invention, a coating liquid including the PC copolymer, and an electrophotographic photoreceptor will be described in detail below. Structure of PC Copolymer The PC copolymer in the exemplary embodiment includes a repeating unit A represented by a formula (1) below and a repeating unit B represented by a formula (2) below, in which an abundance ratio represented by $Ar^1/(Ar^1+Ar^2)$ is in a range of 35 mol % to 75 mol % and an abundance ratio represented by $Ar^2/(Ar^1+Ar^2)$ is in a range of 25 mol % to 65 mol %.

[Formula 4]

-continued

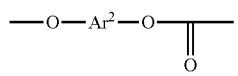  (2)

In the formulae, $Ar^1$ is a group represented by a formula (3) below and $Ar^2$ is a group represented by a formula (4) below.

[Formula 5]

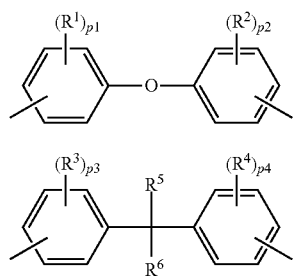

(3)

(4)

In the formulae (3) and (4), $R^1$ to $R^4$ each are a fluoroalkyl group having 1 to 5 carbon atoms, an alkyl group having 1 to 5 carbon atoms, or an alkoxy group having 1 to 5 carbon atoms.

$R^5$ to $R^6$ each are a hydrogen atom or an alkyl group having 1 to 2 carbon atoms.

$p_1$ to $p_4$ each are an integer of 0 to 4. When an aromatic ring is substituted by two or more of $R^1$ to $R^4$ ($p_1$ to $p_4 \geq 2$), the two or more of $R^1$ to $R^4$ are mutually the same or different.

$R^5$ to $R^6$ are mutually different.

In the PC copolymer in the exemplary embodiment, a content of a skeleton unit including $Ar^1$ ($Ar^1$ skeleton unit) is in a range of 35 mol % to 75 mol %, preferably of 40 mol % to 75 mol %, particularly preferably of 45 mol % to 72 mol %.

When the content of $Ar^1$ exceeds 75 mol %, a highly regular dihydroxydiphenylether structure is likely to be crystallized, thereby decreasing solubility. When the content of $Ar^1$ is less than 35 mol %, mechanical characteristics and wear resistance to any wear modes (e.g., aggressive wear and adhesive wear) become insufficient. The aforementioned mol % is a value obtained when a molar copolymer composition represented by $Ar^1/(Ar^1+Ar^2)$ is represented by percentage. The mechanical characteristics refer to resistance to mechanical deterioration being unlikely to occur.

In the PC copolymer in the exemplary embodiment, a content of a skeleton unit including $Ar^2$ ($Ar^2$ skeleton unit) is in a range of 25 mol % to 65 mol %, preferably of 25 mol % to 60 mol %, particularly preferably of 28 mol % to 55 mol %. When the $Ar^2$ skeleton unit exceeds 65 mol %, a ratio of the $Ar^1$ skeleton unit is decreased, so that advantages of the $Ar^1$ skeleton unit and advantages of the $Ar^2$ skeleton unit may not be obtained in a balanced manner. Moreover, the solubility becomes excessively high to adversely deteriorate solvent resistance, so that cracks are likely to be developed. When the $Ar^2$ skeleton unit is less than 25 mol %, advantages of $Ar^2$ is not sufficiently obtained, so that the wear resistance and the solubility become insufficient.

In the formulae (3) and (4), examples of the alkyl group having 1 to 5 carbon atoms for $R^1$ to $R^4$ are a linear alkyl or branched alkyl group. Examples of the linear or branched alkyl group are a methyl group, an ethyl group, propyl groups, butyl groups, pentyl groups and hexyl groups. Moreover, a cyclic alkyl such as a cyclopentyl group may be used.

The fluoroalkyl group having 1 to 5 carbon atoms for $R^1$ to $R^4$ is exemplified by a group (e.g., a trifluoromethyl group) obtained by substituting the above alkyl group having 1 to 5 carbon atoms with one or more fluorine atoms.

Examples of the alkoxy group having 1 to 5 carbon atoms are a methoxy group and ethoxy group.

In the formula (4), examples of the alkyl group having 1 to 2 carbon atoms for $R^5$ to $R^6$ are a methyl group and an ethyl group.

The PC copolymer having the repeating unit A represented by the formula (1) and the repeating unit B represented by the formula (2) is preferably a PC copolymer represented by a formula (10) below.

[Formula 6]

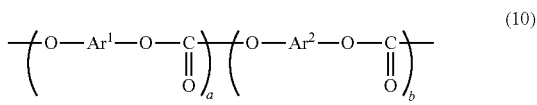

(10)

In the formula (10), a represents the repeating number of the repeating unit A represented by the formula (1) and b represents the repeating number of the repeating unit B represented by the formula (2).

a represents $Ar^1/(Ar^1+Ar^2)$ and is preferably in a range of 0.35 to 0.75 as described above. b represents $Ar^2/(Ar^1+Ar^2)$ and is preferably in a range of 0.25 to 0.65.

In terms of improvement in electrical characteristics, the PC copolymer in the exemplary embodiment is preferably a PC copolymer in which a chain end of each of the repeating units represented by the formulae (1) and (2) is terminated by a monovalent aromatic group or a monovalent fluorine-containing aliphatic group.

The monovalent aromatic group may be a group containing an aliphatic group such as an alkyl group. The monovalent fluorine-containing aliphatic group may be a group containing an aromatic group.

The monovalent aromatic group forming the chain end is preferably an aryl group having 6 to 12 carbon atoms. Examples of the aryl group are a phenyl group and a biphenyl group. Examples of a substituent to be bonded to the aromatic group and the aliphatic group (e.g., alkyl group) bonded to the aromatic group are halogen atoms such as a fluorine atom, a chlorine atom and a bromine atom. The substituent bonded to the aromatic group is exemplified by an alkyl group having 1 to 20 carbon atoms. This alkyl group may be a group bonded by a halogen atom as described above and a group bonded by an aryl group.

The monovalent fluorine-containing aliphatic group forming an end group is exemplified by a fluorine-containing alkyl group having 1 to 20 carbon atoms.

In terms of inhibition of crystallization of $Ar^1$ and an excellent solution stability, the PC copolymer in the exemplary embodiment is preferably made from at least one of bischloroformate oligomers represented by formulae (13) and (14) below, in which an average number of monomer units (n) of the at least one of bischloroformate oligomers is preferably in a range of 1.0 to 1.99.

[Formula 7]

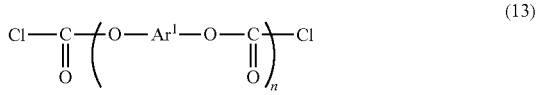

(13)

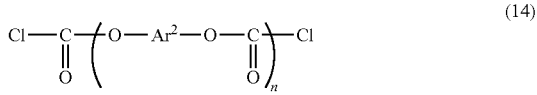

(14)

The bischloroformate oligomer has the average number of monomer units (n) preferably in a range of 1.0 to 1.50, more preferably of 1.0 to 1.30.

When the bischloroformate oligomer having the average number of monomer units in the range of 1.0 to 1.99 is used, even though an $Ar^1$ skeleton unit represented by the formula (1) is highly crystalline, a triad fraction of the $Ar^1$ skeleton unit in the PC copolymer can be reduced to 5 mol % or less. Consequently, as crystallization of the PC copolymer can be inhibited, the PC copolymer can exhibit an excellent solution stability. The triad fraction of the $Ar^1$ skeleton is more preferably 3 mol % or less, further preferably 1 mol % or less.

Herein, the triad and the triad fraction will be described below.

As for a chain of the monomer units A and B, the three monomer units in row is defined as a triad. The number of moles of each triad in the total number of moles of all the triads, which is represented by percentage, is defined as a triad fraction.

For instance, totally eight triads, which are represented by AAA, AAB, BBA, BAB, ABB and BBB as well as framed ABA and BAA, are present in the following chain of the monomer units A and B. In this chain, the number of moles of each triad in the total number of moles of all the eight triads, which is represented by percentage, is defined as the triad fraction.

[Formula 8]

AAAAAABAAAAABABAAAAAAAABAAABABBAA

According to NMR-$^{13}$C, in the following formula, each of carbons at 4 positions represented by α and β indicates an inherent shift value due to influence from right and left skeletons. In the following formula, the carbons receive influence from the right and left B skeletons. Accordingly, each of the triads represented by ABA, BAA, AAA, AAB, BBA, BAB, ABB and BBB contained in the chain can be represented by percentage.

In the PC copolymer of the exemplary embodiment, the group represented by the formula (4) (i.e., $Ar^2$) is preferably a divalent group derived from 2,2-bis(4-hydroxyphenyl)butane (hereinafter, also referred to as bisphenol B). Bisphenol B has favorable characteristics to aggressive wear and a favorable solubility. On the other hand, the group represented by the formula (3) (i.e., $Ar^1$) has favorable mechanical characteristics and a favorable wear resistance to any wear modes such as aggressive wear and adhesive wear. Accordingly, when the PC copolymer including $Ar^1$ and $Ar^2$ at a specific copolymer ratio is used in the photosensitive layer of the electrophotographic photoreceptor, the electrophotographic photoreceptor having an extremely excellent durability can be provided.

Even when $Ar^2$ is bisphenol B, the content of the $Ar^2$ skeleton unit in the PC copolymer is in a range of 25 mol % to 65 mol %, more preferably in a range of 28 mol % to 50 mol %.

Manufacturing Method of PC Copolymer

The PC copolymer of this exemplary embodiment is suitably obtainable by interfacial polycondensation of a bischloroformate oligomer represented by a formula (13) below and a divalent phenol compound represented by a formula (16) in the presence of an acid-binding agent, or by interfacial polycondensation of a bischloroformate oligomer represented by a formula (14) below and a divalent phenol compound represented by a formula (15) in the presence of an acid-binding agent. The above reaction(s) is conducted in the presence of a terminal terminator and/or a branching agent as needed.

A mixture of the bischloroformate oligomers represented by the formulae (13) and (14) may be used with the divalent phenol compound represented by the formula (15) or (16) for interfacial polycondensation.

[Formula 10]

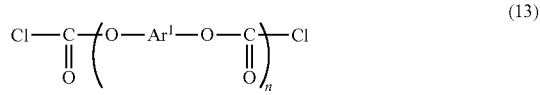

(13)

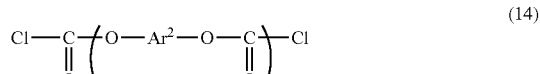

(14)

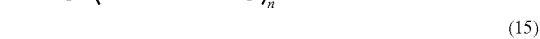

(15)

(16)

Herein, n in the formulae (13) and (14) represents an average number of monomer units of the bischloroformate oligo-

[Formula 9]

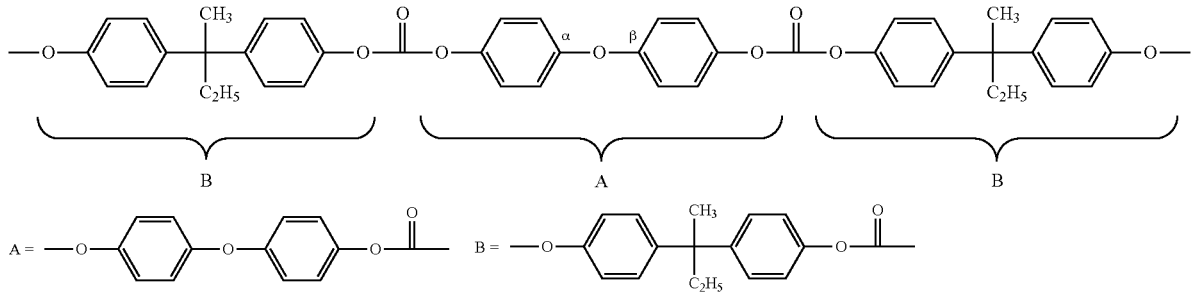

mer. In the bischloroformate oligomer of the formulae (13) and (14), the average number of monomer units (n) is in a range of 1.0 to 1.99. The PC copolymer of the exemplary embodiment is easily manufactured from the bischloroformate oligomer having the average number of monomer units in the range of 1.0 to 1.99.

A method for calculating the average number of monomer units (n) is exemplified by a method described later in Examples. On the other hand, even when the bischloroformate oligomer of the formula (13) having the average number of monomer units of 1.0 is reacted with the divalent phenol compound (comonomer) of the formula (15) at a molar ratio of 1:1, the abundance ratio of $Ar^1$ may not easily reach 50 mol %. This is because, when the manufactured $Ar^1$ oligomer is reacted with a monomer including $Ar^2$, the chloroformate group at the end of the $Ar^1$ oligomer may be reacted with a base present in a reaction system to form a hydroxyl group, resulting in polycondensation of the hydroxyl group with another $Ar^1$ oligomer having chlorine at its end.

The bischloroformate oligomer represented by the formulae (13) and (14) used in a manufacturing method of the PC copolymer of the exemplary embodiment is derived from the bisphenol compound represented by the formulae (15) and (16).

Examples of the bisphenol compound represented by the formula (16) are 2,2-bis(4-hydroxyphenyl)butane, 2,2-bis(3-methyl-4-hydroxyphenyl)butane, 2,2-bis(3-trifluoromethyl-4-hydroxyphenyl)butane, 2,2-bis(3-methoxy-4-hydroxyphenyl)butane, 1,1-bis(4-hydroxyphenyl)ethane, 1,1-bis(3-methyl-4-hydroxyphenyl)ethane, 1,1-bis(3-trifluoromethyl-4-hydroxyphenyl)ethane, 1,1-bis(4-hydroxyphenyl)propane, and 1,1-bis(3-methyl-4-hydroxyphenyl)propane.

Among the above examples, 2,2-bis(4-hydroxyphenyl)butane, 1,1-bis(4-hydroxyphenyl)ethane are preferable. 2,2-bis(4-hydroxyphenyl)butane is more preferable in order to provide the PC copolymer having an excellent wear resistance particularly to aggressive wear as described above. Moreover, these bisphenol compounds are preferable since a favorable coating liquid can be provided when the bisphenol compounds are used as the PC copolymer for the electrophotographic photoreceptor. One of the bisphenol compounds may be used alone, or two or more thereof may be used in combination.

Next, examples of the bisphenol compound represented by the formula (15) are 4,4-dihydroxydiphenylether, bis(3-methyl-4-hydroxyphenyl)ether, bis(3-trifluoromethyl-4-hydroxyphenyl)ether, bis(3-methoxy-4-hydroxyphenyl)ether, bis(3-ethyl-4-hydroxyphenyl)ether, 3,3-dihydroxydiphenylether, and bis(3-propyl-4-hydroxyphenyl)ether.

Among the above examples, 4,4-dihydroxydiphenylether is preferable, since it provides the PC copolymer having a favorable wear resistance to any wear modes such as aggressive wear and adhesive wear.

In terms of the wear resistance, the aforementioned 4,4-dihydroxydiphenylether is a divalent phenol monomer having 2 mass % or less of the solubility to methylene chloride (homopolymer) and being substantially impossible to be synthesized in a form of a homopolymer having a number average molecular weight of 10000 or more because of crystallization during polycarbonate synthesis reaction by interfacial polycondensation.

Whether or not the solubility of 4,4-dihydroxydiphenylether to methylene chloride is 2 mass % or less can be checked as follows: 2 parts by mass of 4,4-dihydroxydiphenylether in a form of a solid homopolymer containing an organic solvent of 500 mass ppm or less and having a viscosity average molecular weight of 15000 to 30000 is immersed in 98 parts by mass of methylene chloride at a room temperature and left for 24 hours; subsequently, the obtained solution is separated into a solid and a liquid; the solid is dried to calculate a mass decrease; and it is checked whether or not the obtained mass decrease is 0.04 part by mass or more.

As the terminal terminator for terminating the chain end, monovalent phenol monovalent carboxylic acid and a derivative thereof are usable.

Examples of the terminal terminator are p-tert-butylphenol, p-phenylphenol, p-cumylphenol, p-perfluorononylphenol, p-(perfluorononylphenyl)phenol, p-(perfluorohexyl) phenol, p-tert-perfluorobutylphenol, perfluorooctylphenol, perfluorohexylphenol, 1-(P-hydroxybenzyl)perfluorodecane, p-[2-(1H,1H-perfluorotridodecyloxy)-1,1,1,3,3,3-hexafluoropropyl]phenol, 3,5-bis(perfluorohexyloxycarbonyl)phenol, p-hydroxyperfluorododecyl benzoate, and p-(1H,1H-perfluorooctyloxy)phenol.

Moreover, fluorine-containing alcohol represented by a formula (30) or (31) below, 1,1,1,3,3,3-tetraphloro-2-propanol and the like are also preferably used as the terminal terminator. Furthermore, fluorine-containing alcohol with an ether bond represented by formulae (32), (33) and (34) below are also preferably used.

$$H(CF_2)_nCH_2OH \quad (30)$$

$$F(CF_2)_mCH_2OH \quad (31)$$

In the formula (30), n is an integer of 1 to 12. In the formula (31), m is an integer of 1 to 12.

[Formula 11]

$$F\text{—}(CF_2)_n{}^{31}\text{—}OCF_2CH_2\text{—}OH \quad (32)$$

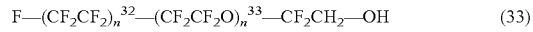

$$F\text{—}(CF_2CF_2)_n{}^{32}\text{—}(CF_2CF_2O)_n{}^{33}\text{—}CF_2CH_2\text{—}OH \quad (33)$$

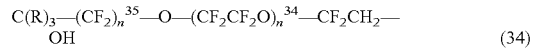

$$C(R)_3\text{—}(CF_2)_n{}^{35}\text{—}O\text{—}(CF_2CF_2O)_n{}^{34}\text{—}CF_2CH_2\text{—}OH \quad (34)$$

In the formula (32), $n^{31}$ is an integer in a range of 1 to 10. In the formula (33), $n^{32}$ is an integer of 0 to 5 and $n^{33}$ is an integer of 1 to 5.

In the formula (34), $n^{34}$ is an integer of 1 to 5 and $n^{35}$ is an integer of 0 to 5. R is $CF_3$ or F.

In the formula (32), $n^{31}$ is preferably an integer in a range of 5 to 8. In the formula (33), $n^{32}$ is preferably an integer of 0 to 3 and $n^{33}$ is preferably an integer of 1 to 3. In the formula (34), $n^{34}$ is preferably an integer of 1 to 3 and $n^{35}$ is preferably an integer of 0 to 3.

Examples of the above fluorine-containing alcohol with the ether bond are compounds as follows.

[Formula 12]

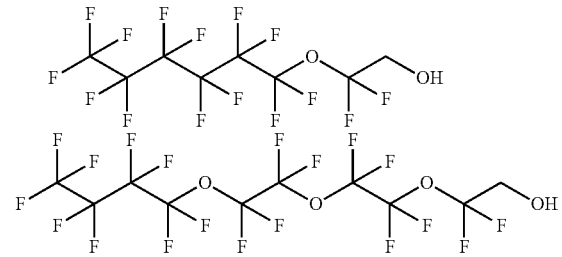

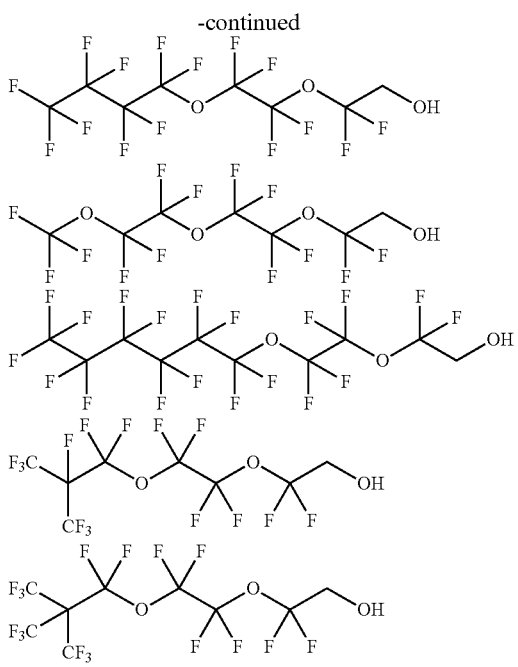

In a molar copolymer composition of the $Ar^1$ skeleton unit, the $Ar^2$ skeleton unit and the chain end, the terminal terminator is added so that a ratio of the chain end is in a range of 0.05 mol % to 30 mol %, more preferably of 0.1 mol % to 10 mol %. When the ratio is more than 30 mol %, mechanical strength may be deteriorated. When the ratio is less than 0.05 mol %, moldability may be deteriorated.

As the monovalent phenol, a monovalent phenol compound derived from a monovalent organic siloxane modified phenyl group is suitably usable.

The monovalent organic siloxane modified phenyl group is exemplified by a group represented by a formula (9) below.

[Formula 13]

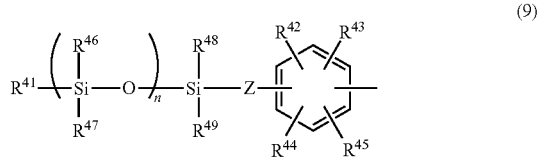

(9)

Z represents a hydrocarbon group having 2 to 6 carbon atoms. Z is preferably an alkylene group, more preferably a methylene group having 2 to 4 repeating units.

$R^{41}$ represents an aliphatic hydrocarbon group having 1 to 6 carbon atoms. $R^{41}$ is preferably an alkyl group having 1 to 6 carbon atoms.

$R^{42}$ to $R^{45}$ each independently represent hydrogen, a substituted or unsubstituted alkyl group having 1 to 12 carbon atoms, a substituted or unsubstituted alkoxy group having 1 to 12 carbon atoms and a substituted or unsubstituted aryl group having 6 to 12 ring carbon atoms.

$R^{46}$ to $R^{49}$ each independently represent a substituted or unsubstituted alkyl group having 1 to 12 carbon atoms and a substituted or unsubstituted aryl group having 6 to 12 ring carbon atoms.

Examples of the substituted or unsubstituted alkyl group having 1 to 12 carbon atoms and the substituted or unsubstituted aryl group having 6 to 12 ring carbon atoms are the same as the groups exemplified in the above description for $R^1$ and $R^2$. A phenyl group and a methyl group are preferable among the examples.

n is an integer of 2 to 600 and represents an average number of repeating units in case of molecular weight distribution.

Examples of the monovalent organic siloxane modified phenyl group are as follows.

[Formula 14]

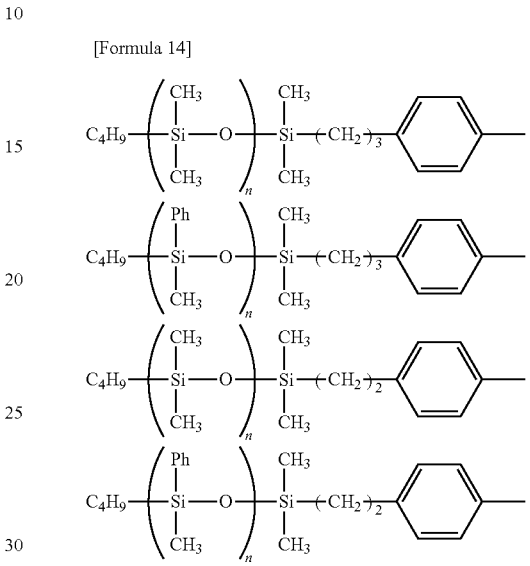

In the electrophotographic photoreceptor including the binder resin in a form of the PC copolymer having the monovalent organic siloxane modified phenyl group, adhesion of extraneous substances such as toner can be reduced.

A ratio of the monovalent organic siloxane modified phenyl group, the ratio being required for expressing the above effects, is in a range of 0.01 mass % to 50 mass % relative to the entire PC copolymer. The ratio of the monovalent organic siloxane modified phenyl group is more preferably in a range of 0.1 mass % to 20 mass %, particularly preferably of 0.5 mass % to 10 mass %.

Examples of the branching agent are phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl)methane, tetrakis[4-(4-hydroxyphenyl isopropyl)phenoxy]methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin and 5-bromoisatin.

An additive amount of the branching agent is preferably 30 mol % or less in the molar copolymer ratio, more preferably 5 mol % or less. When the additive amount is more than 30 mol %, moldability may be deteriorated.

Examples of the acid-binding agent usable in interfacial polycondensation are: alkali metal hydroxides such as sodium hydroxide, potassium hydroxide, lithium hydroxide and cesium hydroxide; alkaline earth metal hydroxides such as magnesium hydroxide and calcium hydroxide; alkali metal weak acidic salts such as sodium carbonate, potassium carbonate and calcium acetate; alkaline earth metal weak acidic salts; and organic bases such as pyridine. Among the examples, alkali metal hydroxides and alkaline earth metal hydroxides such as sodium hydroxide, potassium hydroxide and calcium hydroxide are preferable. These acid binding agents are also usable in a mixture. A use ratio of the acid-binding agent may be also suitably adjusted in consideration of stoichiometric proportion (equivalent amount) in the reaction. Specifically, it is only required to use 1 equivalent or more, preferably 1 to 10 equivalent of the acid-binding agent per 1 mol of the total amount of a hydroxyl group of the divalent phenol (material).

A solvent used herein is only required to exhibit solubility to the obtained copolymer at a predetermined level or more. Preferable examples of the solvent are: aromatic hydrocarbon such as toluene and xylene; halogenated hydrocarbon such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2,-tetrachloroethane, pentachloroethane and chlorobenzene; ketones such as cyclohexaneone, acetone and acetophenone; and ethers such as tetrahydrofuran and 1,4-dioxane. One of the above solvents may be used alone, or two or more of the above may be used in combination. With use of two solvents that are not miscible with each other, interfacial polycondensation may be conducted.

Preferable examples of a catalyst are: tertiary amines such as trimethylamine, triethylamine, tributylamine, N,N-dimethylcyclohexyl amine, pyridine, N,N-diethyl aniline and N,N-dimethyl aniline; quaternary ammonium salts such as trimethyl benzyl ammonium chloride, triethyl benzyl ammonium chloride, tributyl benzyl ammonium chloride, trioctyl methyl ammonium chloride, tetrabutyl ammonium chloride and tetrabutyl ammonium bromide; and quaternary phosphonium salts such as tetrabutyl phosphonium chloride and tetrabutyl phosphonium bromide.

Further, a small amount of an antioxidant such as sodium sulfite and hydrosulfite salt may be added to the reaction system as needed.

The PC copolymer in the exemplary embodiment can be specifically manufactured by various methods. For instance, the bischloroformate oligomer having a small number of monomer units is manufactured by reacting the bisphenol compound represented by the formula (15) with phosgene and the like, and then the manufactured bischloroformate oligomer is reacted with the compound represented by the formula (16) in the presence of a mixture of the above solvent and an alkali aqueous solution (the acid binding agent). This method is preferable in that the abundance ratio represented by $Ar^1/(Ar^1+Ar^2)$ in the formula (10) is adjustable to a preferable range.

Herein, the bischloroformate oligomer having a small number of monomer units refers to the bischloroformate oligomer in which the value of n is in a range of 1.0 to 1.99 in the formula (13) or (14).

The manufacturing method of the bischloroformate oligomer is preferably a manufacturing method described below, for instance, since a cleaning process in manufacturing the polycarbonate copolymer can be simplified.

The manufacturing method of the bischloroformate oligomer having the value of n in the formula (13) or (14) in a range of 1.0 to 1.99 is exemplified by the following manufacturing method.

First, the bisphenol compound of the formula (15) or (16) is suspended in a hydrophobic solvent such as methylene chloride and then added with phosgene to form a mixed solution. On the other hand, a tertiary amine such as triethylamine is dissolved in a hydrophobic solvent such as methylene chloride to form a solution. The solution is dropped into the above mixed solution for reaction at the room temperature or lower. Hydrochloric acid and deionized water are added to the obtained reactant mixture to be cleaned. An organic phase including a polycarbonate oligomer having a small number of monomer units is obtained.

A dropping temperature and reaction temperature are typically in a range of 0 to 70 degrees C., preferably of 5 to 65 degrees C. Both dropping time and reaction time are in a range of 15 minutes to 4 hours, preferably of 30 minutes to about 3 hours. The thus obtained polycarbonate oligomer preferably has an average number of monomer units (n) in a range of 1.00 to 1.99, more preferably of 1.00 to 1.60.

The aromatic divalent phenol monomer represented by the formula (15) or (16) is added to the organic phase containing the thus obtained bischloroformate oligomer having a small number of monomer units to be reacted. The reaction temperature is 0 to 150 degrees C., preferably 5 to 40 degrees C., particularly preferably 10 to 25 degrees C.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependent on the reaction temperature, is typically in a range of 0.5 minute to 10 hours, preferably of 1 minute to 3 hours.

In the reaction, the aromatic divalent phenol monomer represented by the formula (15) or (16) is desirably added in a form of an aqueous solution or an organic-solvent solution. The order of the addition is not specifically limited. In the above manufacturing method, the catalyst, the terminal terminator, the branching agent and the like may be added as needed at the time of manufacturing the bischloroformate oligomer or at the time of subsequent polymerization reaction, or both at the time of manufacturing the bischloroformate oligomer and at the time of subsequent polymerization reaction.

The thus obtained PC copolymer contains the repeating unit(s) represented by the formula (1) and the repeating unit(s) represented by the formula (2).

As long as an object of the invention is not hampered, the PC copolymer may contain a polycarbonate unit having a structure unit other than those of the formulae $Ar^1$ and $Ar^2$ or a unit having a polyester structure or a polyether structure.

In order to control the reduced viscosity $[\eta_{sp}/C]$ of the obtained PC copolymer within the above-described range, various methods such as a method of selecting the reaction conditions and a method of adjusting the use amount of the branching agent and the terminal terminator are available. In addition, if necessary, the obtained PC copolymer may be subjected to a physical treatment (e.g., mixing and cutoff) and/or a chemical treatment (e.g., polymer reaction, cross linking or partial degradation), so that the PC copolymer having a predetermined reduced viscosity $[\eta_{sp}/C]$ may be obtained.

The obtained reaction product (crude product) may be subjected to various aftertreatments such as known separation and refinement, so that the PC copolymer having desirable purity (desirable refining degree) may be obtained.

Structure of Coating Liquid

A coating liquid according to this exemplary embodiment at least contains the PC copolymer according to this exemplary embodiment and a solvent capable of dissolving or dispersing the PC copolymer according to this exemplary embodiment. Moreover, in addition to the above, the coating liquid may contain a low molecular compound, a colorant such as a dye and a pigment, a functional compound such as a charge transporting material, an electron transporting material, a hole transporting material and a charge generating material, a filler such as an inorganic or organic filler, fiber and particles, and an additive such as an antioxidant, a UV absorbent and an acid scavenger. Materials that may be contained besides the resin are exemplified by materials contained in the components for the electrophotographic photoreceptor described later. The coating liquid may contain other resins as long as the advantages of this exemplary embodiment are not hampered. The coating liquid is exemplified by the following components of the electrophotographic photoreceptor. As the solvent usable in this exemplary embodiment, a single solvent may be used or a plurality of solvents may be used by mixture, considering solubility, dispersibility, viscosity, evaporation speed, chemical stability and stability against physical changes of the PC copolymer according to this exemplary embodiment and other material. The solvent is exemplified by the components of the electrophotographic photoreceptor described later.

The concentration of the copolymer component in the coating liquid is required to be suitable for usage of the coating liquid. The concentration is preferably in a range of 0.1 mass % to 40 mass %, more preferably of 1 mass % to 35 mass %, most preferably of 5 mass % to 30 mass %. When the concentration exceeds 40 mass %, coating performance is deteriorated due to excessively high viscosity. When the viscosity is less than 0.1 mass %, the coating liquid may flow away due to excessively low viscosity, so that a uniform film cannot be obtained. For drying the obtained film, long time may be required due to excessively low concentration of the coating liquid, so that a desired thickness of the film may not be obtained.

The PC copolymer in the exemplary embodiment has a good compatibility with the charge transporting material and is not whitened or gelled even when dissolved in the solvent. Accordingly, the coating liquid according to this exemplary embodiment containing the copolymer, the charge transporting material and the solvent can be stably stored without whitening or gelation of the polymer components over a long period of time. When a photosensitive layer of the electrophotographic photoreceptor is formed with use of the coating liquid, an excellent electrophotographic photoreceptor having no defect on an image without crystallization of the photosensitive layer is obtainable.

A ratio of the PC copolymer to the charge transporting material in the coating liquid is typically 20:80 to 80:20 by mass, preferably 30:70 to 70:30 by mass.

In the coating liquid in the exemplary embodiment, one of the PC copolymer in the exemplary embodiment may be used alone, or two or more of the above PC copolymer may be used together.

The coating liquid in the exemplary embodiment is preferably used for forming the charge transporting layer of a laminated electrophotographic photoreceptor in which a sensitive layer at least includes the charge generating layer and the charge transporting layer. When the coating liquid further contains the charge generating material, the coating liquid is also usable for forming a sensitive layer of a single-layer electrophotographic photoreceptor.

Structure of Electrophotographic Photoreceptor

As long as the above-described PC copolymer is used in a photosensitive layer, the electrophotographic photoreceptor according to this exemplary embodiment may be any electrophotographic photoreceptor (e.g. one of known various electrophotographic photoreceptors). However, the photosensitive layer of the electrophotographic photoreceptor is preferably a layered electrophotographic photoreceptor including at least one charge generating layer and at least one charge transporting layer, or alternatively the photosensitive layer of the electrophotographic photoreceptor is preferably a single-layer electrophotographic photoreceptor including both a charge generating material and a charge transporting material.

While the PC copolymer may be used in any portion of the photosensitive layer, in order for the invention to sufficiently provide an advantage, the copolymerized PC is preferably used as the binder resin of the charge transporting material, as the binder resin of the single photosensitive layer or as a surface protecting layer. When the electrophotographic photoreceptor has double charge transporting layers (i.e., multilayer electrophotographic photoreceptor), the PC copolymer is preferably used in either one of the charge transporting layers.

In the electrophotographic photoreceptor according to this exemplary embodiment, one type of the PC copolymer according to this exemplary embodiment may be singularly used, or two or more types thereof may be used together. Further, as long as an object of the invention is not hampered, a binder-resin component such as another polycarbonate may be contained as desired. In addition, an additive such as an antioxidant may be contained.

The electrophotographic photoreceptor according to this exemplary embodiment includes a conductive substrate and a photosensitive layer on the conductive substrate. When the photosensitive layer has the charge generating layer and the charge transporting layer, the charge transporting layer may be laminated on the charge generating layer, or the charge generating layer may be laminated on the charge transporting layer. Alternatively, a single layer of the electrophotographic photoreceptor may contain both the charge generating material and the charge transporting material. Further, when necessary, a surface layer of the electrophotographic photoreceptor may be provided with a conductive or insulating protective film. The electrophotographic photoreceptor may be further provided with an intermediate layer(s) such as adhesive layer for enhancing adhesion between layers and blocking layer for blocking charges.

Various conductive substrate materials (e.g., known materials) are usable for forming the electrophotographic photoreceptor in the exemplary embodiment. Examples of such conductive substrate materials are: a plate, a drum and a sheet made of material such as aluminum, nickel, chrome, palladium, titanium, molybdenum, indium, gold, platinum, silver, copper, zinc, brass, stainless steel, lead oxide, tin oxide, indium oxide, ITO (indium tin oxide; tin-doped indium oxide) and graphite; glass, cloth, paper, plastic film, plastic sheet and seamless belt having been treated with conductive treatment through coating by vapor deposition, sputtering or application; and a metal drum having been treated with metal oxidation treatment by electrode oxidation and the like.

The charge generating layer contains at least the charge generating material. The charge generating layer can be obtained by forming a layer of the charge generating material on the underlying substrate by vacuum deposition, sputtering or the like, or by forming a layer in which the charge generating material is bound onto the underlying substrate with use of a binder resin. While various methods (e.g., known methods) are usable for forming the charge generating layer with use of a binder resin, the charge generating layer is preferably obtained as a wet molding typically formed by applying, for instance, a coating agent in which both the charge generating material and the binder resin are dispersed or dissolved in a suitable solvent onto a predetermined underlying substrate and drying the applied coating agent.

Various known materials are usable as the charge generating material in the charge generating layer. Examples of such materials are: elementary selenium such as amorphous selenium and trigonal selenium; selenium alloy such as selenium-tellurium; selenium compound or selenium-containing composition such as $As_2Se_3$; inorganic material formed of 12 group element and 16 group element in the peri dic system such as zinc oxide and CdS—Se; oxide-base semiconductor such as titanium oxide; silicon-base material such as amorphous silicon; metal-free phthalocyanine pigment such as I-type metal-free phthalocyanine and χ-type metal-free phthalocyanine; metal phthalocyanine pigment such as α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine whose black angle 2θ has its diffraction peak at 27.3±0.2 degrees in a X-ray diffraction diagram, and gallium phthalocyanine; cyanine dye; anthracene pigment; bisazo pigment; pyrene pigment; polycyclic quinone pigment; quinacridone pigment; indigo pigment; perylene pigment; pyrylium dye; squarium pigment; anthoanthrone pigment; benzimidazole pigment; azo pigment; thioindigo pigment; quinoline pigment; lake pigment; oxazine pigment; dioxazine pigment; triphenylmethane pigment; azulenium dye; triarylmethane dye; xanthine dye; thiazine dye; thiapyrylium dye; polyvinyl carbazole; and bisbenzimidazole pigment. One of the above compounds may be used alone, or two or more of them may be mixed for use as the charge generating material. Among the above charge generating materials, a compound disclosed in JP-A-11-172003 is preferable.

The charge transporting layer can be obtained as a wet molding by forming a layer in which the charge transporting material is bound onto the underlying substrate by a binder resin.

The binder resin for the charge generating layer and the charge transporting layer is not specifically limited. Various known resins are usable. Examples of such resins are polystyrene, polyvinyl chloride, polyvinyl acetate, vinyl chloride-vinyl acetate copolymer, polyvinyl acetal, alkyd resin, acrylic resin, polyacrylonitrile, polycarbonate, polyurethane, epoxy resin, phenol resin, polyamide, polyketone, polyacrylamide, butyral resin, polyester resin, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol-formaldehyde resin, styrene-alkyd resin, melamine resin, polyether resin, benzoguanamine resin, epoxy-acrylate resin, urethane acrylate resin, poly-N-vinylcarbazole, polyvinyl butyral, polyvinyl formal, polysulphone, casein, gelatine, polyvinyl alcohol, ethyl cellulose, cellulose nitrate, carboxymethyl cellulose, vinylidene chloride-base polymer latex, acrylonitrile-butadiene copolymer, vinyl toluene-styrene copolymer, soybean oil-modified alkyd resin, nitrated polystyrene, polymethylstyrene, polyisoprene, polythiocarbonate, polyarylate, polyhaloarylate, polyallyl ether, polyvinyl acrylate and polyester acrylate.

One of the above resins may be used alone, or two or more of them may be mixed for use. The binder resin used in the charge generating layer and the charge transporting layer is preferably the PC copolymer according to this exemplary embodiment.

While various known methods are usable for forming the charge transporting layer, the charge transporting layer is preferably obtained as a wet molding formed by applying a coating liquid in which both the charge transporting material and the PC copolymer in the exemplary embodiment are dispersed or dissolved in a suitable solvent onto a predetermined underlying substrate and drying the applied coating liquid. A blend ratio of the charge transporting material and the PC copolymer for forming the charge transporting layer is preferably 20:80 to 80:20 by mass, more preferably 30:70 to 70:30 by mass.

In the charge transporting layer, one of the PC copolymer in the exemplary embodiment may be used alone, or two or more thereof may be used together. As long as an object of the invention is not hampered, the charge transporting layer may also contain another binder resin in addition to the PC copolymer according to this exemplary embodiment.

The thickness of the charge transporting layer is typically approximately 5 μm to 100 μm, preferably 10 μm to 30 μm. When the thickness is less than 5 μm, the initial potential may be lowered. When the thickness is more than 100 μm, electrophotographic characteristics may be deteriorated.

Various known compounds are usable as the charge transporting material that is usable together with the PC copolymer in the exemplary embodiment. Preferable examples of such compounds are carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, quinone compound, quinodimethane compound, thiazole compound, triazole compound, imidazolone compound, imidazolidine compound, bisimidazolidine compound, oxazolone compound, benzothiazole compound, benzimidazole compound, quinazoline compound, benzofuran compound, acridine compound, phenazine compound, poly-N-vinylcarbazole, polyvinyl pyrene, polyvinyl anthracene, polyvinyl acridine, poly-9-vinyl phenyl anthracene, pyrene-formaldehyde resin, ethylcarbazole resin, and a polymer having the above structure in the main chain or side chain. One of the above compounds may be used alone, or two or more of the above may be used together.

Among the above charge transporting materials, specifically exemplified compounds disclosed in JP-A-11-172003 and charge transporting substances represented by the following structures are particularly preferably used.

[Formula 15]
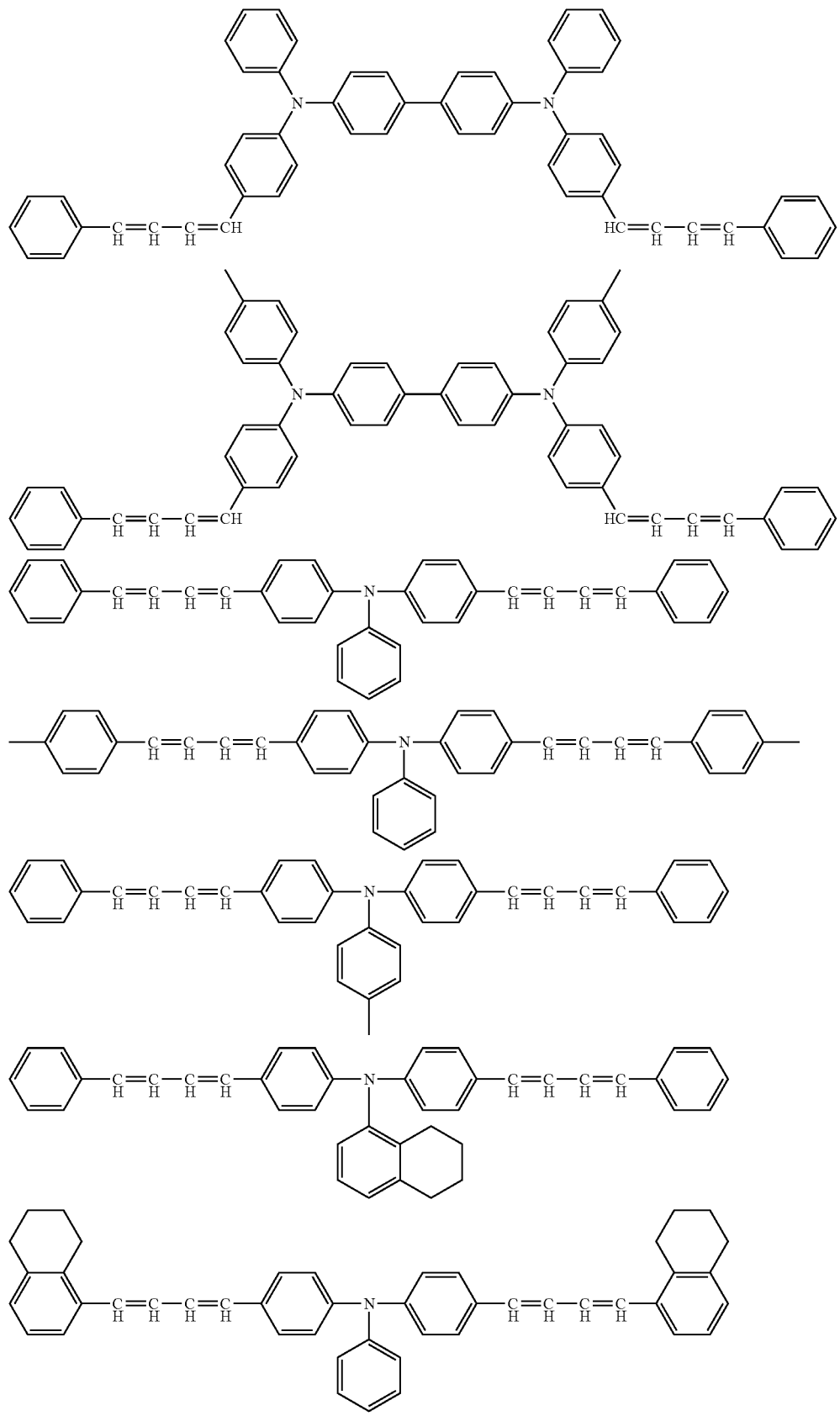

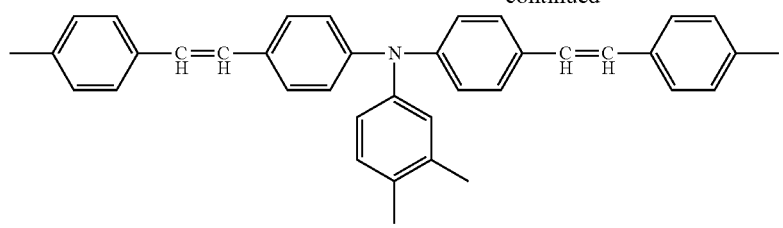
[Formula 16]
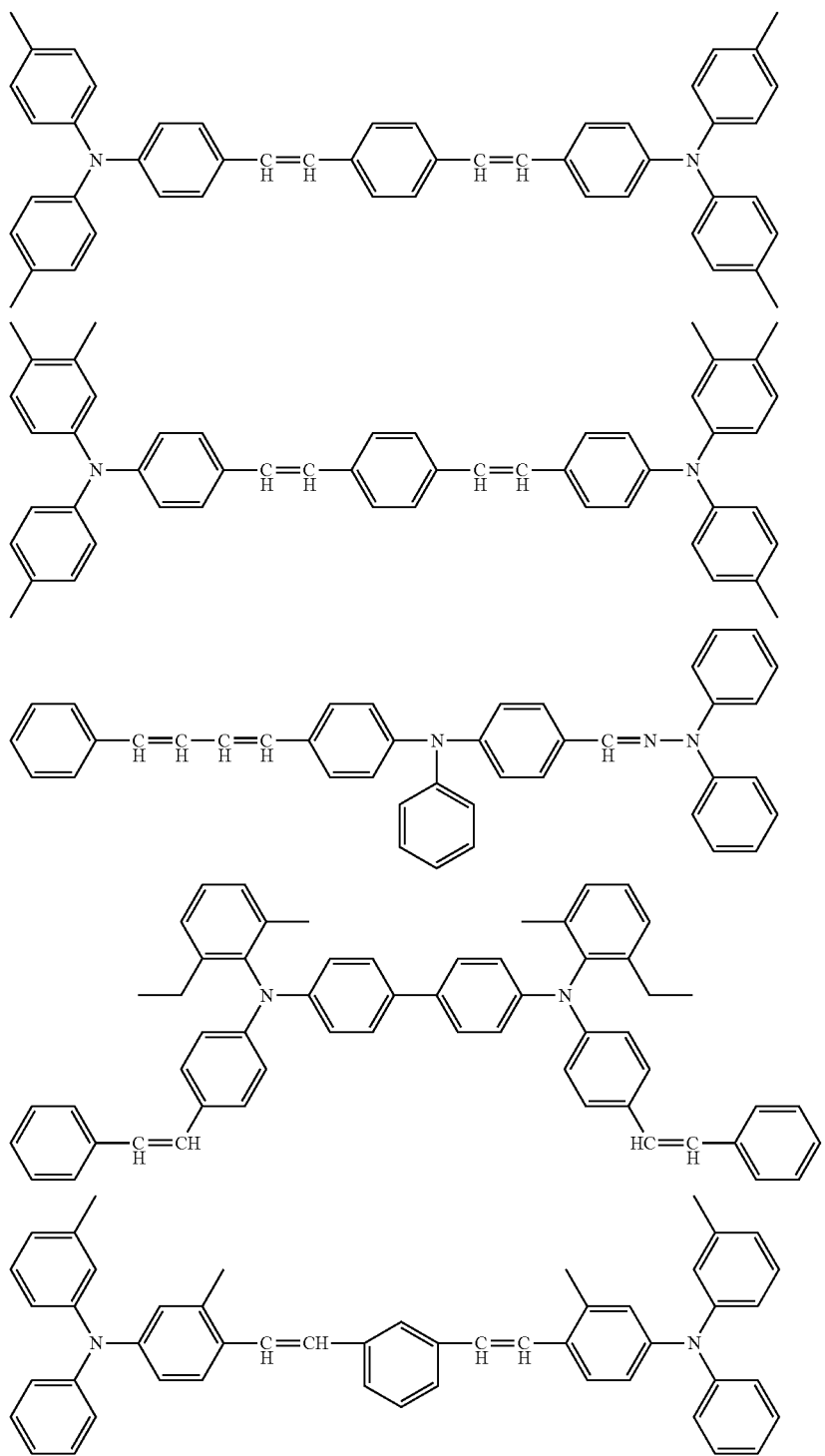

-continued
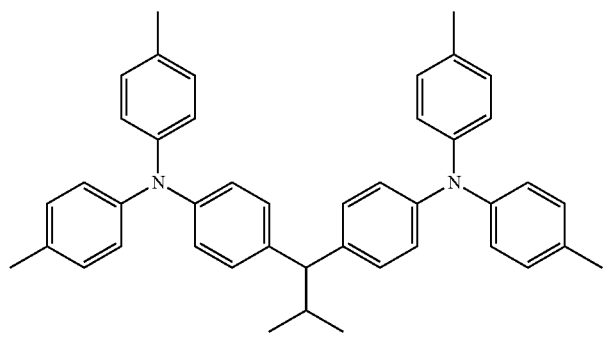
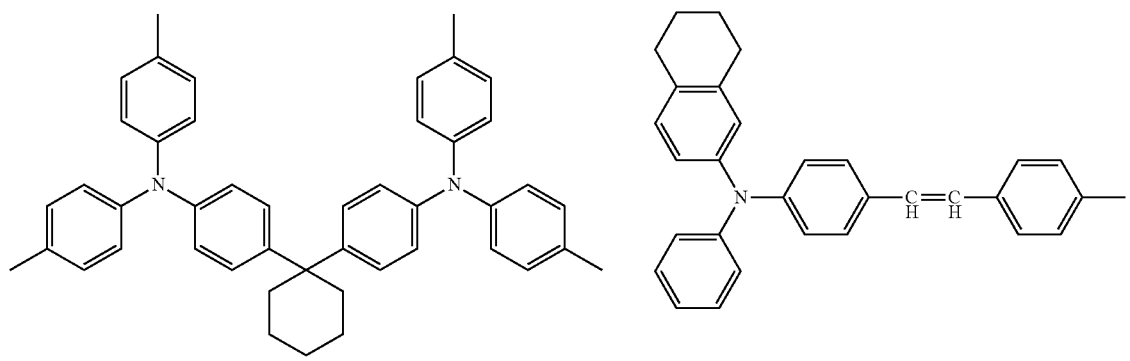
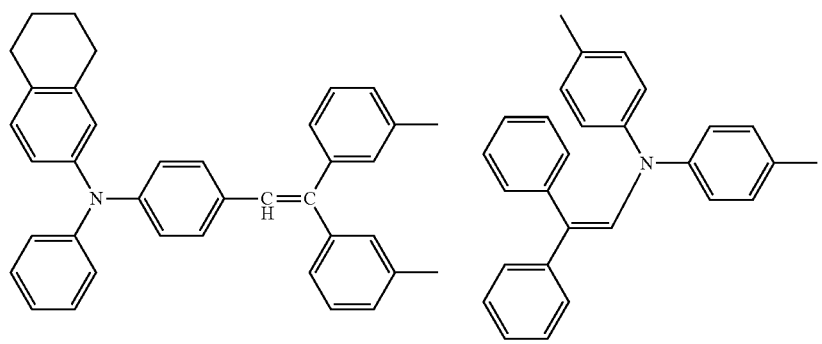
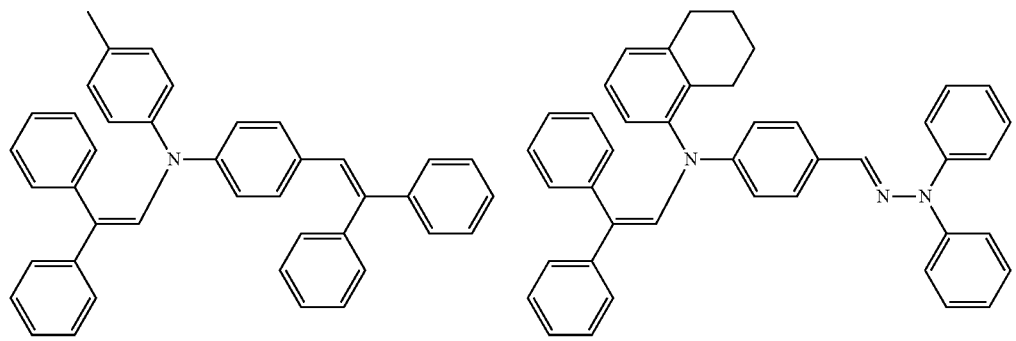
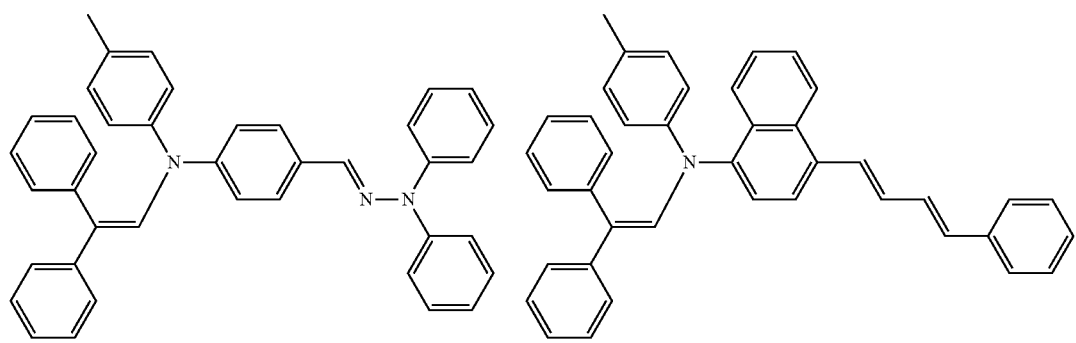

[Formula 17]
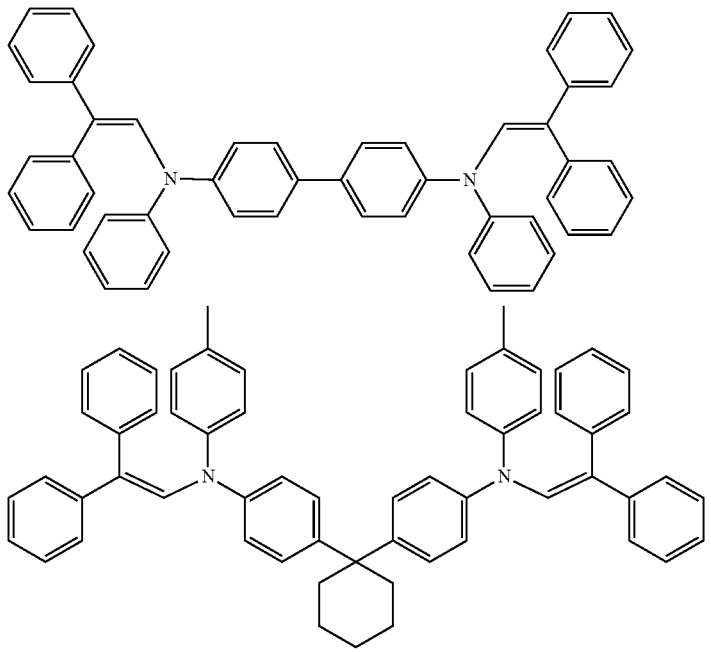
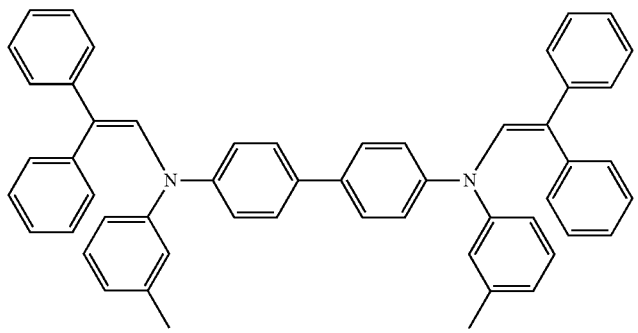
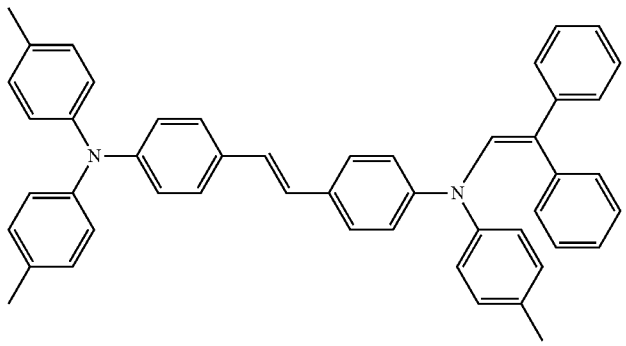
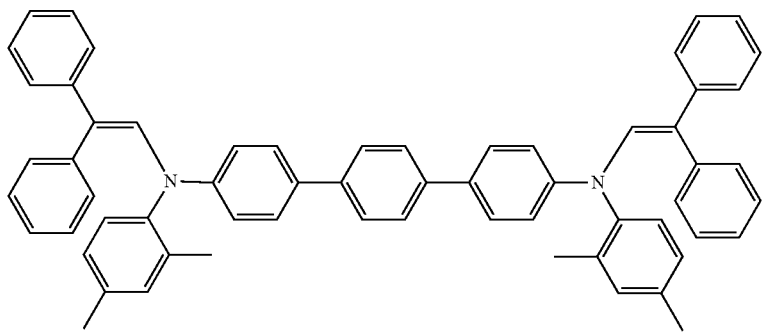

-continued
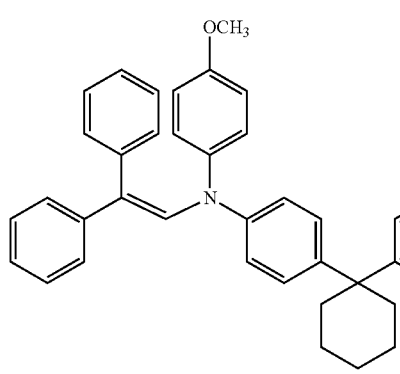 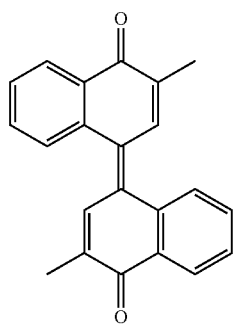
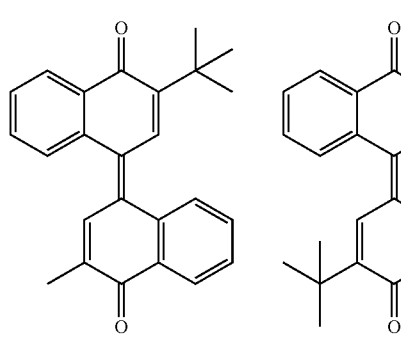 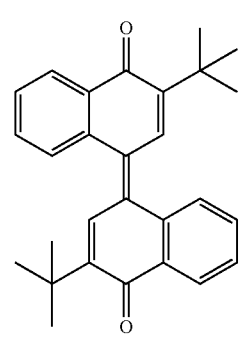 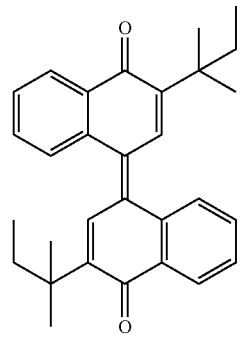
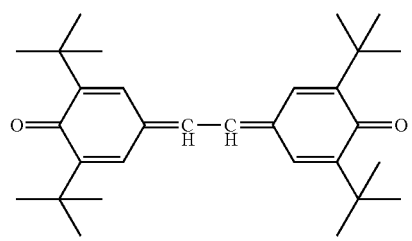 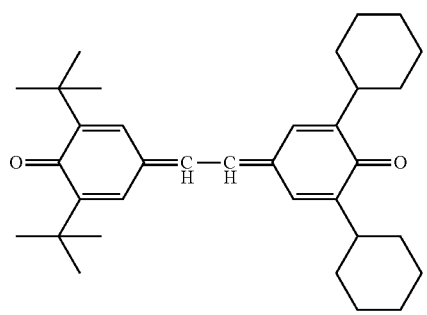
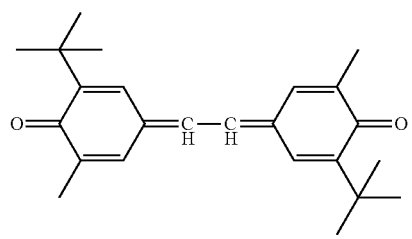 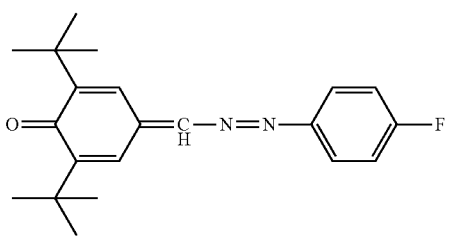
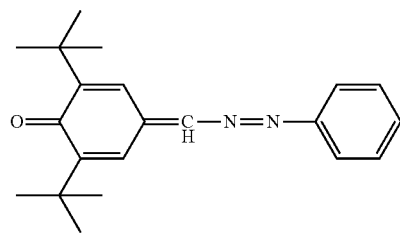 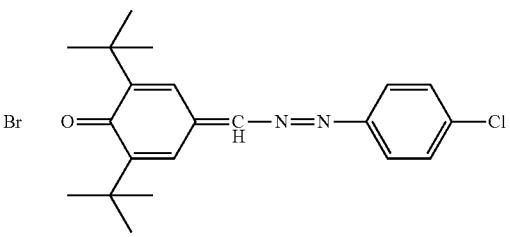
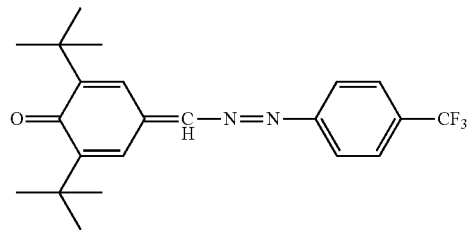

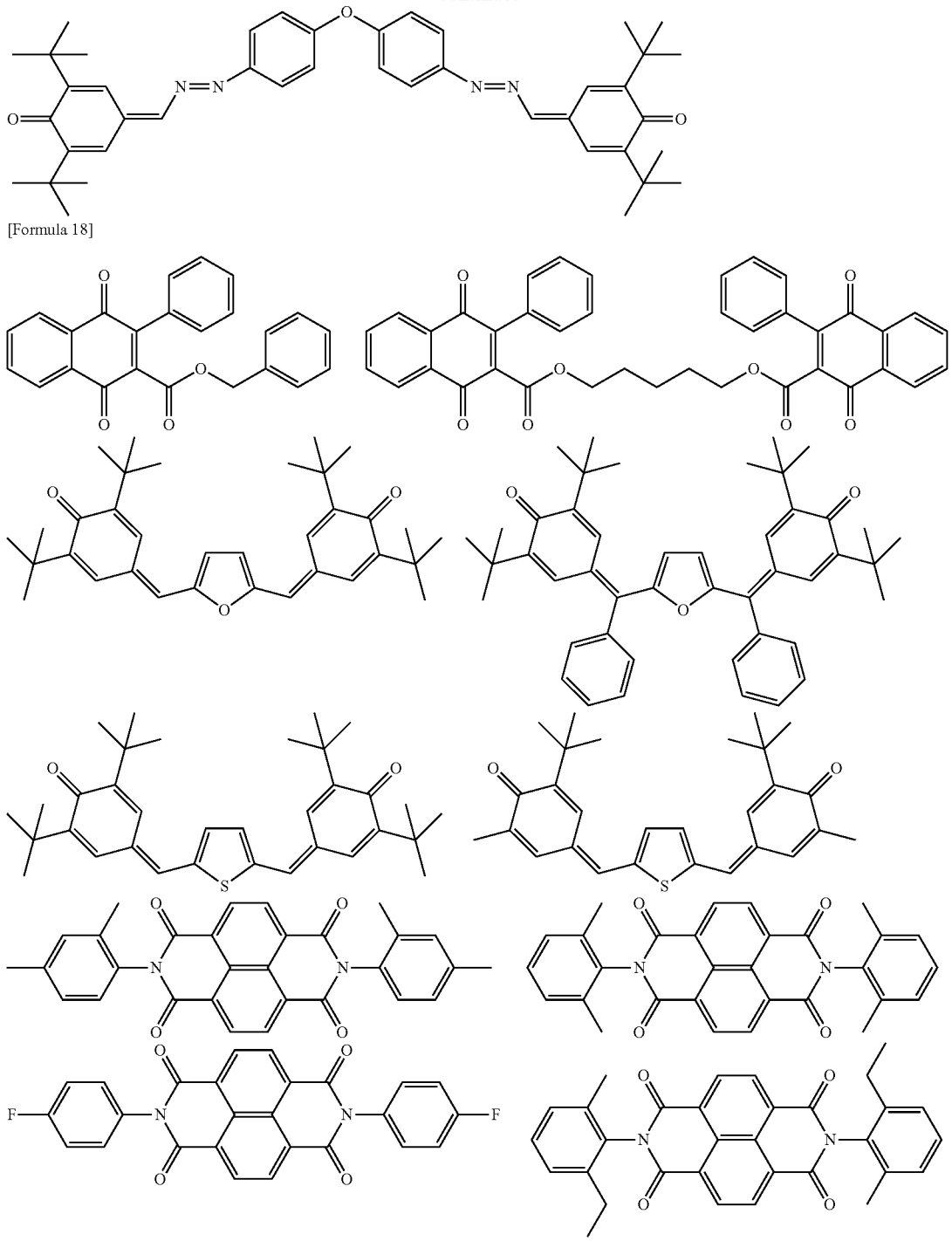

[Formula 18]

In the electrophotographic photoreceptor in the exemplary embodiment, the PC copolymer in the exemplary embodiment is preferably used as the binder resin in at least one of the charge generating layer and the charge transporting layer.

The electrophotographic photoreceptor in the exemplary embodiment may be provided with a typically-used undercoat layer between the conductive substrate and the photosensitive layer. Examples of the undercoat layer are particles such as titanium oxide, aluminum oxide, zirconia, titanic acid, zirconic acid, lanthanum lead, titanium black, silica, lead titanate, barium titanate, tin oxide, indium oxide and silicon oxide, and components such as polyamide resin, phenol resin, casein, melamine resin, benzoguanamine resin, polyurethane resin, epoxy resin, cellulose, cellulose nitrate, polyvinyl alcohol and polyvinyl butyral resin. The resin usable for the undercoat layer may be the above binder resin or the PC copolymer in the exemplary embodiment. One of the above particles and the resins may be used alone or a variety thereof may be mixed together in use. When a mixture thereof is used, a combination of inorganic particles and a resin is preferable because a flat and smooth film can be made.

The thickness of the undercoat layer is in a range of 0.01 µm to 10 µm, preferably of 0.1 µm to 7 µm. When the thickness is less than 0.01 µm, it is difficult to form an even undercoat layer. On the other hand, when the thickness is more than 10 µm, electrophotographic characteristics may be deteriorated. The electrophotographic photoreceptor according to this exemplary embodiment may be provided with a typically-used known blocking layer between the conductive substrate and the photosensitive layer. The blocking layer may be made of the same resin as the binder resin. Alternatively, the blocking layer may be made of the PC copolymer in the exemplary embodiment. A thickness of the blocking layer is in a range of 0.01 µm to 20 µm, preferably of 0.1 µm to 10 µm. When the thickness is less than 0.01 µm, it is difficult to form an even blocking layer. On the other hand, when the thickness is more than 20 µm, electrophotographic characteristics may be deteriorated.

The electrophotographic photoreceptor in the exemplary embodiment may be further provided with a protective layer laminated on the photosensitive layer. The protective layer may be made of the same resin as the binder resin. The PC copolymer in the exemplary embodiment is particularly preferably used for the protective layer. A thickness of the protective layer is in a range of 0.01 µm to 20 µm, preferably of 0.1 µm to 10 µm. The protective layer may contain a conductive material such as the charge generating material, the charge transporting material, an additive, a metal, oxides thereof, nitrides thereof, salts thereof, alloy thereof, carbon black and an organic conductive compound.

In order to enhance performance of the electrophotographic photoreceptor, the charge generating layer and the charge transporting layer may be added with a binder, a plasticizer, a curing catalyst, a fluidity adder, a pinhole controller and a spectral-sensitivity sensitizer (sensitizer dye). In addition, in order to prevent increase in residual potential after repeated use, reduction in charged potential and deterioration of sensitivity, various chemical substances and additives such as antioxidant, surfactant, curl inhibitor and leveling agent may be added.

Examples of the binders are silicone resin, polyamide resin, polyurethane resin, polyester resin, epoxy resin, polyketone resin, polycarbonate resin, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, cellulose nitrate resin, urea resin, phenol resin, phenoxy polyvinyl butyral resin, formal resin, vinyl acetate resin, vinyl acetate/vinyl chloride copolymer resin, and polyester carbonate resin. In addition, a heat and/or light-curable resin are also usable. The binder is not specifically limited to the above, as long as the binder is an electric-insulating resin from which a film is formable under normal conditions, and as long as an advantage of the invention is not hampered.

Examples of the plasticizer are biphenyl, chlorinated biphenyl, o-terphenyl, halogenated paraffin, dimethylnaphthalene, dimethyl phthalate, dibutyl, phthalate, dioctyl phthalate, diethylene glycol phthalate, triphenyl phosphate, diisobutyl adipate, dimethyl sebacate, dibutyl sebacate, laurate butyl, methylphthalyl ethyl glycolate, dimethyl glycol phthalate, methylnaphthalene, benzophenone, polypropylene, polystyrene, and fluorohydrocarbon.

Examples of the curing catalyst are methanesulfonic acid, dodecylbenzenesulfonic acid and dinonylnaphthalene disulfonic acid. Examples of the fluidity adder are Modaflow and Acronal 4F. Examples of the pinhole controller are benzoin and dimethyl phthalate. The above plasticizer, curing catalyst, fluidity adder and pinhole controller are preferably contained at a content of 5 mass % or less of the charge transporting material.

When a sensitizer dye is used as a spectral-sensitivity sensitizer, suitable examples of the sensitizer dye are triphenylmethane-base dye such as methyl violet, crystal violet, night blue and Victria blue, acridine dye such as erythrosine, Rhodamine B, Rhodamine 3R, acridine orange and frapeosine, thiazine dye such as methylene blue and methylene green, oxazine dye such as capri blue and meldra blue, cyanine dye, merocyanine dye, styryl dye, pyrylium salt dye and thiopyrylium salt dye.

In order to enhance the sensitivity, reduce the residual potential and reduce fatigue due to repeated use, the photosensitive layer may be added with an electron-accepting material. Examples of the electron-accepting material are preferably compounds having high electron affinity such as succinic anhydride, maleic anhydride, dibromo maleic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic anhydride, tetracyanoethylene, tetracyanoquinodimethane, o-dinitro benzene, m-dinitro benzene, 1,3,5-trinitro benzene, p-nitrobenzonitrile, picryl chloride, quinone chlorimide, chloranil, bromanil, benzoquinone, 2,3-dichloro benzoquinone, dichloro dicyano parabenzoquinone, naphthoquinone, diphenoquinone, tropoquinone, anthraquinone, 1-chloro anthraquinone, dinitro anthraquinone, 4-nitrobenzophenone, 4,4-dinitrobenzophenone, 4-nitrobenzal malonodinitrile, $\alpha$-cyano-$\beta$-(p-cyanophenyl)ethyl acrylate, 9-anthracenyl methylmalonodinitrile, 1-cyano-(p-nitrophenyl)-2-(p-chlorophenyl) ethylene, 2,7-dinitrofluorenone, 2,4,7-trinitrofluorenone, 2,4,5,7-tetranitrofluorenone, 9-fluorenylidene-(dicyanomethylene malononitrile), polynitro-9-fluorenylidene-(dicyanomethylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either the charge generating layer or the charge transporting layer. An additive ratio of the compounds to be added is 0.01 part by mass to 200 parts by mass per 100 parts by mass of the charge generating material or the charge transporting material, preferably 0.1 part by mass to 50 parts by mass.

Further, in order to improve surface quality, tetrafluoroethylene resin, trifluoroethylene chloride resin, tetrafluoroethylene hexafluoropropylene resin, vinyl fluoride resin, vinylidene fluoride resin, difluoroethylene dichloride resin, copolymer(s) thereof, or fluorine-base graft polymer may be used. An additive ratio of such surface modifiers is 0.1 mass % to 60 mass % of the binder resin, preferably 5 mass % to 40 mass %. When the additive ratio is less than 0.1 mass %, surface modification such as enhancement of surface durability and reduction in surface energy may not be sufficient. When the additive ratio is more than 60 mass %, the electrophotographic characteristics may be deteriorated.

Examples of the antioxidant are preferably a hindered phenol-base antioxidant, aromatic amine-base antioxidant, hindered amine-base antioxidant, sulfide-base antioxidant and organophosphate-base antioxidant. An additive ratio of the antioxidant is 0.01 mass % to 10 mass % of the charge transporting material, preferably 0.1 mass % to 2 mass %.

Preferable examples of the antioxidant are compounds represented by chemical formulae disclosed in the Specification of JP-A-11-172003 ([Chemical Formula 94] to [Chemical Formula 101]).

One of the above antioxidants may be used alone, or two or more of them may be mixed in use. In addition to the photosensitive layer, the above antioxidant may be added to the surface protecting layer, the undercoat layer and the blocking layer.

Examples of the solvent usable in forming the charge generating layer and the charge transporting layer are aromatic solvent such as benzene, toluene, xylene and chlorobenzene, ketone such as acetone, methyl ethyl ketone and cyclohexaneone, alcohol such as methanol, ethanol and isopropanol, ester such as acetic ether and ethyl cellosolve, halogenated hydrocarbon such as carbon tetrachloride, carbon tetrabromide, chloroform, dichloromethane and tetrachloroethane, ether such as tetrahydrofuran, dioxolane and dioxane, dimethylformamide, dimethylsulfoxide, and diethyl formamide. One of the above solvents may be used alone, or two or more of them may be used together as a mixture solvent.

The photosensitive layer of a single-layer electrophotographic photoreceptor can be easily formed by applying the binder resin (PC copolymer) according to this exemplary embodiment with use of the charge generating material, the charge transporting material and the additive. The charge transporting material is preferably added with the above-described hole-transport material and/or an electron-transport material. Compounds exemplified in JP-A-2005-139339 are preferably usable as the electron-transport material.

Various coating applicators (e.g., known applicators) can perform application of each layer. Examples of such a coating applicator are an applicator, a spray coater, a bar coater, a chip coater, a roll coater, a dip coater and a doctor blade.

The thickness of the photosensitive layer of the electrophotographic photoreceptor is 5 µm to 100 µm, preferably 8 µm to 50 µm. When the thickness is less than 5 µm, the initial potential tends to be low. When the thickness is more than 100 µm, electrophotographic characteristics may be deteriorated. In the electrophotographic photoreceptor, a ratio of the charge generating material to the binder resin is 1:99 to 30:70 by mass, more preferably 3:97 to 15:85 by mass. On the other hand, a ratio of the charge transporting material to the binder resin is 10:90 to 80:20 by mass, more preferably 30:70 to 70:30 by mass.

Since the electrophotographic photoreceptor in the exemplary embodiment uses the PC copolymer in the exemplary embodiment, a coating agent is not whitened (gelled) in manufacturing the photosensitive layer. In addition, since containing a molding (binder resin) molded of the PC copolymer in the exemplary embodiment in its photosensitive layer, the electrophotographic photoreceptor according to this exemplary embodiment has excellent durability (wear resistance) and electrification characteristics. Thus, the photoreceptor according to this exemplary embodiment can maintain its excellent electrophotographic characteristics for a long time. Accordingly, the photoreceptor according to this exemplary embodiment is favorably applicable to various electrophotographic fields such as copier (black and white copier, multi-color copier, full-color copier; analog copier, digital copier), printer (laser printer, LED printer, liquid-crystal shutter printer), facsimile, platemaker and equipment capable of functioning as a plurality of them.

The electrophotographic photoreceptor according to this exemplary embodiment is electrified in use by corona discharge (corotron, scorotron), contact charging (charge roll, charge brush) or the like. Examples of the charge roll are a charge roll by DC electrification and a charge roll by AC and DC superimposed electrification. For exposure, a halogen lamp, a fluorescent lamp, laser (semiconductor, He—Ne), LED or a photoreceptor internal exposure system may be used. For image development, dry developing such as cascade developing, two-component magnetic brush developing, one-component insulating toner developing and one-component conductive toner developing, and wet developing may be used. For transfer, electrostatic transfer such as corona transfer, roller transfer and belt transfer, pressure transfer and adhesive transfer may be used. For fixing, heat roller fixing, radiant flash fixing, open fixing, pressure fixing and the like may be used. For cleaning and neutralizing, brush cleaner, magnetic brush cleaner, electrostatic brush cleaner, magnetic roller cleaner, blade cleaner and those in which cleaner is omitted may be used. Examples of a resin for toner are styrene-base resin, styrene-acrylic base copolymer resin, polyester, epoxy resin and cyclic hydrocarbon polymer. The toner may be spherical or amorphous. The toner may also be controlled to have a certain shape (such as spheroidal shape and potato shape). The toner may be pulverized toner, suspension-polymerized toner, emulsion-polymerized toner, chemically-pelletized toner, or ester-elongation toner.

EXAMPLES

Next, the invention will be described in detail with reference to Examples and Comparatives. However, the invention is not limited to the examples but may include various modifications and applications as long as such modifications and applications do not depart from a technical idea of the invention.

Manufacturing Example

Preparation of Oligomer

Manufacturing Example 1

Synthesis of DHPE Oligomer (Bischloroformate)

45.2 kg (224 mol) of 4,4-dihydroxydiphenylether (DHPE) was suspended in 1080 L of methylene chloride, to which 66.0 kg (667 mol) of phosgene was added and dissolved. Into this obtained solution, a solution in which 44.0 kg (435 mol) of triethylamine was dissolved in 120 L of methylene chloride was dropped at 2.2 to 17.8 degrees C. for 2 hours and 50 minutes. After the solution was stirred at 17.9 to 19.6 degrees C. for 30 minutes, 900 L of methylene chloride was distilled away at 14 to 22 degrees C. 210 L of deionized water, 1.2 kg of concentrated hydrochloric acid and 450 g of hydrosulphite were added to the residual solution for cleaning. Subsequently, cleaning with 210 L of deionized water was repeated five times. A methylene chloride solution of a DHPE oligomer having a chloroformate group at its molecular terminal was obtained. The obtained solution had a chloroformate concentration of 1.14 mol/L, a solid concentration of 0.19 kg/L and an average number of monomer units of 1.03. This obtained material is referred to as "DHPE-CF" hereinafter.

The average number of monomer units (n) was obtained by the following formula:

$$\text{average number of monomer units } (n) = 1 + (Mav - M1)/M2 \quad \text{(Numerical Formula 1)}$$

In the numerical formula 1, Mav represents (2×1000/(CF value), M2 represents (M1−98.92), and M1 represents a molecular weight of the bischloroformate compound when n=1 in formulae (13) and (14). The CF value (N/kg) represents (CF value/concentration). The CF value (N) represents the number of chlorine molecule in the bischloroformate compound represented by the formulae (13) and (14) contained in 1 L of the reaction solution. The concentration (kg/L) represents an amount of the solid content obtained by concentrating the 1-L reaction solution. Herein, 98.92 is a total atom weight of two chlorine atoms, one oxygen atom and one carbon atom which are desorbed at polycondensation of the bischloroformate compounds.

Manufacturing Example 2

Synthesis of Bisphenol B Oligomer
(Bischloroformate)

Into a mixed solution containing 210 g (0.867 mol) of 2,2-bis(4-hydroxyphenyl)butane (bisphenol B), 1058 mL of methylene chloride and 183 g (1.85 mol) of phosgene, a solution prepared by diluting 200.8 g (1.98 mol) of triethylamine in 460 mL of methylene chloride was dropped at 14 to 18.5 degrees C. for 2 hours and 50 minutes. After the reactant mixture was stirred at 18.5 to 19 degrees C. for one hour, 600 ml of methylene chloride was distilled away at 10 to 22 degrees C. 15.0 mL of concentrated hydrochloric acid, 150 mL of deionized water and 0.100 g of hydrosulphite were added to the reactant mixture for cleaning. Subsequently, cleaning with water was repeated until an aqueous phase becomes neutral. Thus, a methylene chloride solution of a bisphenol B oligomer having a chloroformate group at its molecular terminal was obtained.

The same operation as in Manufacturing Example 1 was conducted except that a diluted solution was dropped. Thus, a methylene chloride solution of a bisphenol B oligomer having a chloroformate group at its molecular terminal was obtained.

The obtained solution had a chloroformate concentration of 1.16 mol/L, a solid concentration of 0.24 kg/L and an average number of monomer units of 1.08. This obtained material is referred to as "B-CF" hereinafter.

Manufacturing Example 3

Synthesis of Bisphenol E Oligomer
(Bischloroformate)

Into a mixed solution containing 73.0 g (0.341 mol) of 1,1-bis(4-hydroxyphenyl)ethane (bisphenol E), 410 mL of methylene chloride and 65 g (0.689 mol) of phosgene, a solution prepared by diluting 68.7 g (0.682 mol) of triethylamine in 245 mL of methylene chloride was dropped at 14 to 18.5 degrees C. for 2 hours and 50 minutes. After the reactant mixture was stirred at 18.5 to 19 degrees C. for one hour, 250 mL of methylene chloride was distilled away at 10 to 22 degrees C. 5.0 mL of concentrated hydrochloric acid, 73 mL of deionized water and 0.47 g of hydrosulphite were added to the reactant mixture for cleaning. Subsequently, cleaning with water was repeated until an aqueous phase becomes neutral. Thus, a methylene chloride solution of a bisphenol E oligomer having a chloroformate group at its molecular terminal was obtained.

The obtained solution had a chloroformate concentration of 1.31 mol/L, a solid concentration of 0.23 kg/L and an average number of monomer units of 1.10. This obtained material is referred to as "E-CF" hereinafter.

Manufacturing Example 4

Synthesis of Bisphenol CB Oligomer
(Bischloroformate)

Into a mixed solution containing 243 g (0.897 mol) of 2,2-bis(3-methyl-4-hydroxyphenyl)butane (bisphenol CB), 1058 mL of methylene chloride and 187 g (1.89 mol) of phosgene, a solution prepared by diluting 199.4 g (1.97 mol) of triethylamine in 460 mL of methylene chloride was dropped at 14 to 16 degrees C. for 1 hours and 38 minutes. The reactant mixture was stirred at 14 to 16 degrees C. for 1 hour and 38 minutes. 5.0 mL of concentrated hydrochloric acid, 200 mL of deionized water and 0.47 g of hydrosulphite were added to the residual solution for cleaning. Subsequently, cleaning with water was repeated until an aqueous phase becomes neutral. Thus, a methylene chloride solution of a bisphenol CB oligomer having a chloroformate group at its molecular terminal was obtained.

The obtained solution had a chloroformate concentration of 1.16 mol/L, a solid concentration of 0.24 kg/L and an average number of monomer units of 1.12. This obtained material is referred to as "CB-CF" hereinafter.

Manufacturing Example 5

Synthesis of Bisphenol A Oligomer
(Bischloroformate)

80.2 g (0.352 mol) of 2,2-bis(4-hydroxyphenyl)propane (bisphenol A) was suspended in 410 mL of methylene chloride, to which 70.4 g (0.702 mol) of triethylamine was added and dissolved. The obtained solution was dropped into a solution prepared by dissolving 69.8 g (0.631 mol) of phosgene in 250 mL of methylene chloride, at 14 to 18.5 degrees C. for 2 hours and 50 minutes. After stirring at 18.5 to 19 degrees C. for one hour, 250 mL of methylene chloride was distilled away at 10 to 22 degrees C. 73 mL of deionized water, 4.5 mL of concentrated hydrochloric acid and 0.47 g of hydrosulphite were added to the reactant mixture for cleaning. Subsequently, cleaning with 330 mL of deionized water was repeated four times. A methylene chloride solution of a bisphenol A oligomer having a chloroformate group at its molecular terminal was obtained.

The obtained solution had a chloroformate concentration of 0.88 mol/L, a solid concentration of 0.21 kg/L and an average number of monomer units of 1.49. This obtained material is referred to as "A-CF" hereinafter.

Manufacturing Example 6

Synthesis of Cooligomer of DHPE and Bisphenol B

A solution prepared by dissolving 60 g of 4,4-dihydroxydiphenylether and 48 g of 2,2-bix(4-hydroxyphenyl)butane in 660 g of a potassium hydroxide aqueous solution having a concentration of 16 mass % was mixed with 640 mL of methylene chloride. Then, while the mixed solution was being stirred, phosgene gas was blown into the mixed solution at 1 L/min while being cooled until pH becomes 9 or less. Subsequently, the reactant solution was separated in a stand still manner, and a methylene chloride solution of an oligomer having a chloroformate group at its molecular terminal was obtained. The obtained solution had a chloroformate concentration of 0.56 mol/L, a solid concentration of 0.196 kg/L and an average number of monomer units of 2.70. This obtained material is referred to as "PCOBB-DE" hereinafter.

Example 1

Manufacturing of PC Copolymer

B-CF (155 mL) of Manufacturing Example 2 and methylene chloride (240 mL) were injected to a reactor provided with a mechanical stirrer, stirring vane and baffle plate. To the obtained solution, p-tert-butylphenol (hereinafter referred to as PTBP) (0.253 g) as a terminal terminator was added and stirred for sufficient mixing. A 4,4-dihydroxydiphenylether solution was separately prepared by a 4,4-dihydroxydiphenylether-solution preparation method including: preparing 140 mL of 2.0N potassium hydroxide aqueous solution (18.1 g of potassium hydroxide); cooling the solution to the room temperature or less; adding 0.25 g of hydrosulphite as an antioxidant and 18.70 g of 4,4-dihydroxydiphenylether; and completely dissolving the mixed solution. After the reactor was cooled down to 15 degrees C. of its inner temperature, the entire amount of the 4,4-dihydroxydiphenylether solution prepared as described above was added to the solution in the reactor. 2.0 mL of a triethylamine aqueous solution (7 vol %) was further added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-1) with the following structure.

Identification of PC Copolymer

The PC copolymer (PC-1) thus obtained was dissolved in methylene chloride to prepare a solution having a concentration of 0.5 g/dl. When a reduced viscosity [$\eta_{sp}/C$] thereof at 20 degrees C. was measured, the result was 1.16 dl/g. A structure and a composition of the obtained PC-1 were analyzed by $^1$H-NMR spectrum method and $^{13}$C-NMR spectrum method. The obtained PC-1 was identified as a PC copolymer having a repeating unit, the number of the repeating unit and a composition as follows.

[Formula 19]

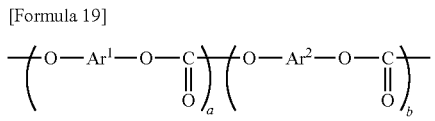

(10)

[Formula 20]

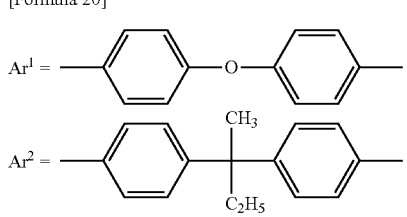

$a = Ar^1/(Ar^1 + Ar^2) = 0.45$   $b = Ar^2/(Ar^1 + Ar^2) = 0.55$

A structure of the PC copolymer in the formula (1) was identified according to the following procedure. Firstly, the structure of the PC copolymer in the formula (1) was analyzed for identification by the $^1$H-NMR spectrum method and $^{13}$C-NMR spectrum method. Copolymerization ratios a and b of respective $Ar^1$ and $Ar^2$ were calculated from the integral intensity.

Manufacturing of Coating Liquid and Electrophotographic Photoreceptor

A film of polyethylene terephthalate resin on which aluminum metal was deposited was used as a conductive substrate. A charge generating layer and a charge transporting layer were sequentially laminated on the surface of the conductive substrate to form a laminate sensitive layer, thereby providing an electrophotographic photoreceptor. 0.5 part by mass of oxotitanium phthalocyanine was used as a charge generating material while 0.5 part by mass of a butyral resin was used as a binder resin. The charge generating material and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 μm.

Next, for use as a charge transporting material, 0.5 g of a compound (CTM-1) represented by the following formula (23) and 0.5 g of the obtained polycarbonate copolymer (PC-1) were dispersed in 10 mL of tetrahydrofuran to prepare a coating liquid. The coating liquid was applied onto the charge generating layer with an applicator and dried, thereby providing a charge transporting layer having a film thickness of approximately 20 μm.

[Formula 21]

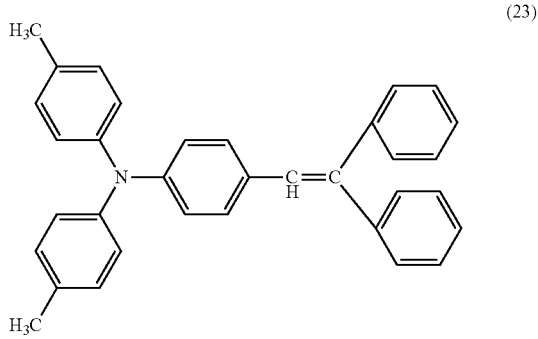

(23)

Evaluation of PC Copolymer and Electrophotographic Photoreceptor

Solubility of the PC copolymer was evaluated by visually checking whitening degree of the prepared coating liquid when the coating liquid was prepared. A case where the PC copolymer was dissolved to show no whitening was marked as A. A case where the PC copolymer was whitened was marked as B.

Wear resistance of the PC copolymer and the electrophotographic photoreceptor was evaluated as follows.

(1) Sample preparation for evaluation on wear resistance of the copolymer: PC-1 (2 g) was dissolved in methylene chloride (12 mL) and the obtained solution was cast into film on a commercially available PET film using an applicator. This film was heated under reduced pressure and a solvent was removed to obtain a film sample having a thickness of approximately 30 μm.

(2) Sample preparation for evaluation on wear resistance of the photoreceptor: PC-1 (1 g) and CTM-1 (0.67 g) were dissolved in methylene chloride (10 mL) and the obtained solution was cast into film on a commercially available PET film using an applicator. This film was heated under reduced pressure and a solvent was removed to obtain a film sample having a thickness of approximately 30 μm.

(3) Evaluation: wear resistance of cast surfaces of the films manufactured in the above processes (1) and (2) was evaluated using a taber abrasion tester (manufactured by Toyo Seiki Seisaku-Sho, Ltd.). Testing conditions: an abrasion ring (model No.: CS-10) to which 500 g of load was applied was brought into contact with each of the film surfaces. A decrease in mass of each of the sample films was measured after 1,000 rotations for the sample film in the process (1) and after 500 rotations for the sample film in the process (2).

Next, electrophotographic characteristics of the obtained electrophotographic photoreceptor were measured using an electrostatic charge tester CYNTHIA54IM (manufactured by GEN-TECH INC.). Specifically, corona discharge of −6 kV was conducted in the static mode. Then, a residual potential (initial residual potential ($V_R$)) after five seconds of light irradiation (E=1.0 μJ/cm$^2$), half-life exposure amount ($E_{1/2}$) and exposure amount for attenuation to minus 100V ($E_{100}$) were measured.

The results are shown in Table 1. The later-described Examples 2 to 4 and Comparatives 1 to 4 were evaluated in the same manner. The results are also shown in Table 1.

Example 2

DHPE-CF (143.7 mL) of Manufacturing Example 1, B-CF (59.6 mL) of Manufacturing Example 2 and methylene chloride (400 mL) were injected to a reactor provided with a mechanical stirrer, stirring vane and baffle plate. To this solution, PTBP (0.189 g) was added as a terminal terminator and stirred for sufficient mixing. A 4,4-dihydroxydiphenylether solution was separately prepared by a 4,4-dihydroxydiphenylether-solution preparation method including: preparing 200 mL of 2.0N potassium hydroxide aqueous solution (26.6 g of potassium hydroxide); cooling the solution to the room temperature or less; adding 0.1 g of hydrosulphite as an antioxidant and 24.25 g of 4,4-dihydroxydiphenylether; and completely dissolving the mixed solution. After the reactor was cooled down to 15 degrees C. of its inner temperature, the entire amount of the 4,4-dihydroxydiphenylether solution prepared as described above was added to the solution in the reactor. 2.0 mL of a triethylamine aqueous solution (7 vol %) was further added with stirring and kept on stirring for one hour.

The obtained reactant mixture was diluted with 0.3 L of methylene chloride and cleaned. A lower layer was separated from the reactant mixture. Then, the reactant mixture was cleaned with 0.2 L of water one time, with 0.2 L of 0.03N hydrochloric acid one time, and with 0.2 L of water three times in this order. The obtained methylene chloride solution was dropped into methanol with stirring. The obtained redeposit was filtered and dried to prepare a PC copolymer (PC-2).

The PC copolymer (PC-2) was identified as a PC copolymer having 1.21 dl/g of a reduced viscosity [$\eta_{sp}$/C] and a structure with the following repeating unit and composition in the formula (10).

[Formula 22]

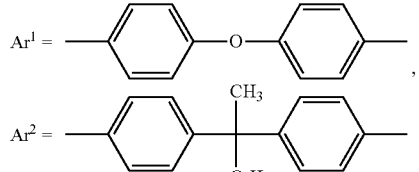

$a = Ar^1/(Ar^1 + Ar^2) = 0.70$   $b = Ar^2/(Ar^1 + Ar^2) = 0.30$

Example 3

E-CF (145 mL) of Manufacturing Example 3 and methylene chloride (265 mL) were injected to a reactor provided with a mechanical stirrer, stirring vane and baffle plate. To this solution, PTBP (0.356 g) was added as a terminal terminator and stirred for sufficient mixing. A 4,4-dihydroxydiphenylether solution was separately prepared by a 4,4-dihydroxydiphenylether-solution preparation method including: preparing 140 mL of 2.0N potassium hydroxide aqueous solution (18.5 g of potassium hydroxide); cooling the solution to the room temperature or less; adding 0.25 g of hydrosulphite as an antioxidant and 19.16 g of 4,4-dihydroxydiphenylether; and completely dissolving the mixed solution. After the reactor was cooled down to 15 degrees C. of its inner temperature, the entire amount of the 4,4-dihydroxydiphenylether solution prepared as described above was added to the solution in the reactor. 2.0 mL of a triethylamine aqueous solution (7 vol %) was further added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-3).

The PC copolymer (PC-3) was identified as a PC copolymer having 1.15 dl/g of a reduced viscosity [$\eta_{sp}$/C] and a structure with the following repeating unit and composition in the formula (10).

[Formula 23]

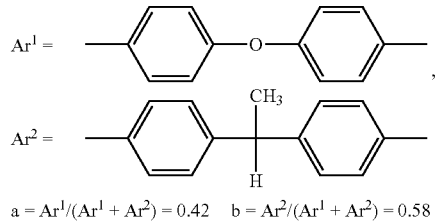

$a = Ar^1/(Ar^1 + Ar^2) = 0.42$   $b = Ar^2/(Ar^1 + Ar^2) = 0.58$

Example 4

CB-CF (150 mL) of Manufacturing Example 4 and methylene chloride (240 mL) were injected to a reactor provided with a mechanical stirrer, stirring vane and baffle plate. To this solution, PTBP (0.253 g) was added as a terminal terminator and stirred for sufficient mixing. A 4,4-dihydroxydiphenylether solution was separately prepared by a 4,4-dihydroxydiphenylether-solution preparation method including: preparing 140 mL of 2.0N potassium hydroxide aqueous solution (18.1 g of potassium hydroxide); cooling the solution to the room temperature or less; adding 0.25 g of hydrosulphite as an antioxidant and 18.70 g of 4,4-dihydroxydiphenylether; and completely dissolving the mixed solution. After the reactor was cooled down to 15 degrees C. of its inner temperature, the entire amount of the 4,4-dihydroxydiphenylether solution prepared as described above was added to the solution in the reactor. 2.0 mL of a triethylamine aqueous solution (7 vol %) was further added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-4).

The PC copolymer (PC-4) was identified as a PC copolymer having 1.20 dl/g of a reduced viscosity $[\eta_{sp}/C]$ and a structure with the following repeating unit and composition in the formula (10).

[Formula 24]

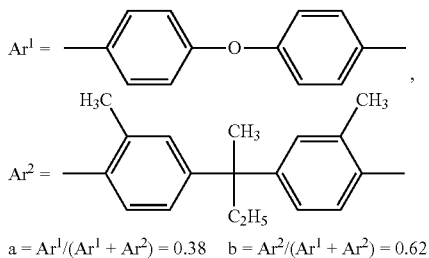

$a = Ar^1/(Ar^1 + Ar^2) = 0.38 \quad b = Ar^2/(Ar^1 + Ar^2) = 0.62$

Comparative 1

A-CF (168 mL) of Manufacturing Example 5 and methylene chloride (240 mL) were injected to a reactor provided with a mechanical stirrer, stirring vane and baffle plate. To this solution, PTBP (0.223 g) was added as a terminal terminator and stirred for sufficient mixing. A 4,4-dihydroxydiphenylether solution was separately prepared by a 4,4-dihydroxydiphenylether-solution preparation method including: preparing 140 mL of 2.0N potassium hydroxide aqueous solution (18.1 g of potassium hydroxide); cooling the solution to the room temperature or less; adding 0.25 g of hydrosulphite as an antioxidant and 18.70 g of 4,4-dihydroxydiphenylether; and completely dissolving the mixed solution. After the reactor was cooled down to 15 degrees C. of its inner temperature, the entire amount of the 4,4-dihydroxydiphenylether solution prepared as described above was added to the solution in the reactor. 2.0 mL of a triethylamine aqueous solution (7 vol %) was further added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-5).

The PC copolymer (PC-5) was identified as a PC copolymer having 1.17 dl/g of a reduced viscosity $[\eta_{sp}/C]$ and a structure with the following repeating unit and composition in the formula (10).

[Formula 25]

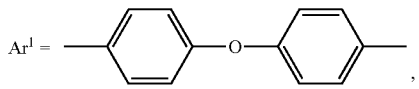

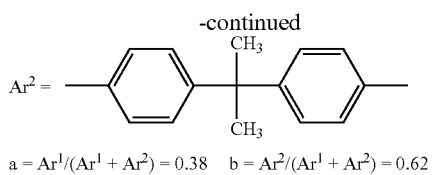

$a = Ar^1/(Ar^1 + Ar^2) = 0.38 \quad b = Ar^2/(Ar^1 + Ar^2) = 0.62$

Comparative 2

B-CF (143 mL) of Manufacturing Example 2 and methylene chloride (242 mL) were injected to a reactor provided with a mechanical stirrer, stirring vane and baffle plate. To this solution, PTBP (0.39 g) was added as a terminal terminator and stirred for sufficient mixing. An aromatic divalent phenol monomer solution was separately prepared by a monomer-solution preparation method including: preparing 149 mL of 1.5N sodium hydroxide aqueous solution; cooling the solution to the room temperature or less; adding 0.1 g of hydrosulphite as an antioxidant and 17.1 g of 4,4'-biphenol; and completely dissolving the mixed solution. The entire amount of the aromatic divalent phenol monomer solution prepared as described above was added to the PTBP solution. After the reactor was cooled down to 15 degrees C. of its inner temperature, 2.0 mL of a triethylamine aqueous solution (7 vol %) was further added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-6).

The PC copolymer (PC-6) was identified as a PC copolymer having 1.19 dl/g of a reduced viscosity $[\eta_{sp}/C]$ and a structure with the following repeating unit and composition in the formula (10).

[Formula 26]

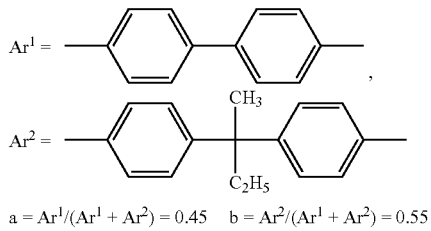

$a = Ar^1/(Ar^1 + Ar^2) = 0.45 \quad b = Ar^2/(Ar^1 + Ar^2) = 0.55$

Comparative 3

A solution prepared by dissolving 0.2 kg of 1,1-bis(4-hydroxyphenyl)cyclohexane (bisphenol Z) in 1.2 kg of a potassium hydroxide aqueous solution having a concentration of 16 mass % was mixed with 1.3 kg of methylene chloride. Then, while the solution was being stirred, phosgene gas was blown into the reaction solution at 1 L/min while being cooled until pH becomes 9 or less. Subsequently, the reaction solution was separated in a stand still manner, and a methylene chloride solution of an oligomer having an organic phase of 2 to 6 polymerization degree and a chloroformate group at its molecular terminal was obtained.

Next, a mechanical stirrer, stirring vane and baffle plate were attached to the reactor. Methylene chloride (190 mL)

was added to the above obtained oligomer (260 mL). To this solution, p-tert-butylphenol (0.59 g) was added as a terminal terminator and stirred for sufficient mixing. After 30 mL of 2N aqueous sodium hydroxide separately prepared was added in this solution, 1 mL of triethylamine aqueous solution (7 vol %) was added with stirring. A biphenol monomer solution was separately prepared by a monomer-solution preparation method including: preparing 120 mL of 2N potassium hydroxide aqueous solution; cooling the solution to the room temperature or less; adding 0.1 g of hydrosulphite and 17.3 g of 1,1-bis(4-hydroxyphenyl)cyclohexane; and completely dissolving the mixed solution. After 10 minutes, the entire amount of the biphenol monomer solution prepared as described above was added to the reaction solution and kept on stirring for one hour.

The obtained reactant mixture was diluted with 2 L of methylene chloride and 1 L of water and cleaned. A lower layer was separated from the reactant mixture. Then, the reactant mixture was further cleaned with 1 L of water one time, with 1 L of 0.01N hydrochloric acid one time, and with 1 L of water three times in this order. The obtained methylene chloride solution was dropped into methanol with stirring. The obtained redeposit was filtered and dried to terminate a chain end by a p-tert-butylphenyl group, thereby preparing a PC polymer (PC-7) of bisphenol Z having the following repeating unit.

The reduced viscosity [$\eta_{sp}/C$] of PC-7 was 1.13 dl/g.

[Formula 27]

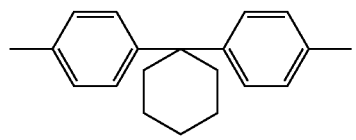

The entire amount of the aromatic divalent phenol monomer solution prepared as described above was added to the PTBP solution. After the reactor was cooled down to 15 degrees C. of its inner temperature, 2.0 mL of a triethylamine aqueous solution (7 vol %) was further added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained redeposit was filtered and dried to prepare a PC copolymer (PC-8).

The PC copolymer (PC-8) was identified as a PC copolymer having 1.21 dl/g of a reduced viscosity [$\eta_{sp}/C$] and a structure with the following repeating unit and composition in the formula (10).

[Formula 28]

$Ar^1 =$ 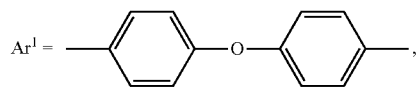, $Ar^2 =$ 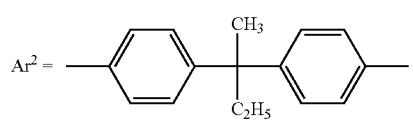

$a = Ar^1/(Ar^1 + Ar^2) = 0.70 \quad b = Ar^2/(Ar^1 + Ar^2) = 0.30$

TABLE 1

| | | PC Copolymer | | | Electrophotographic photoreceptor | | | |
| --- | --- | --- | --- | --- | --- | --- | --- | --- |
| | | Reduced Viscosity (dl/g) | Wear Resistance (mg) | Solubility | Wear Resistance (mg) | Half-life exporure amount ($E_{1/2}$) (μJ/cm$^2$) | Exposure amount for attenuation to −100 V ($E_{100}$) (μJ/cm$^2$) | Initial residual potential ($V_R$) (V) |
| Example 1 | (PC-1) | 1.16 | 1.5 | A | 6.2 | 0.134 | 0.605 | −5 |
| Example 2 | (PC-2) | 1.21 | 1.6 | A | 6.3 | 0.132 | 0.570 | −5 |
| Example 3 | (PC-3) | 1.15 | 1.6 | A | 6.4 | 0.135 | 0.610 | −5 |
| Example 4 | (PC-4) | 1.20 | 1.7 | A | 6.5 | 0.133 | 0.590 | −5 |
| Comparative 1 | (PC-5) | 1.17 | 3.2 | A | 8.6 | 0.134 | 0.620 | −5 |
| Comparative 2 | (PC-6) | 1.19 | 3.4 | A | 7.0 | 0.140 | 0.720 | −10 |
| Comparative 3 | (PC-7) | 1.13 | 10.5 | A | 13.3 | 0.139 | 0.710 | −10 |
| Comparative 4 | (PC-8) | 1.21 | 1.7 | B | 6.5 | 0.212 | 1.315 | −100 |

Comparative 4

PCOBB-DE (214 mL) of Manufacturing Example 6 and methylene chloride (252 mL) were injected to a reactor provided with a mechanical stirrer, stirring vane and baffle plate. To this solution, PTBP (0.37 g) was added as a terminal terminator and stirred for sufficient mixing. An aromatic divalent phenol monomer solution was separately prepared by a monomer-solution preparation method including: preparing 160 mL of 1.8N sodium hydroxide aqueous solution; cooling the solution to the room temperature or less; adding 0.2 g of hydrosulphite as an antioxidant and 9.7 g of 4,4-dihydroxydiphenylether; and completely dissolving the mixed solution.

Evaluation Results

Table 1 shows evaluation results of Examples 1 to 4 and Comparatives 1 to 4. In comparison between Examples 1 to 4 and Comparatives 1 to 3, the PC copolymers and the electrophotographic photoreceptor of Examples 1 to 4 were observed to have an extremely favorable wear resistance, a stable solubility to the organic solvent and favorable electrical characteristics. In Comparative 4, the wear resistance is favorable in the same manner as in Examples 1 to 4, but the solubility is poor and whitened. Such a poor solubility influences the evaluation of the electrophotographic photoreceptor, thereby significantly deteriorating the exposure sensitivity and the residual potential.

The invention claimed is:

1. A polycarbonate copolymer comprising
a repeating unit A represented by a formula (1) below and a repeating unit B represented by a formula (2) below,
wherein an abundance ratio represented by $Ar^1/(Ar^1+Ar^2)$ is in a range of 35 mol % to 75 mol %, and an abundance ratio represented by $Ar^2/(Ar^1+Ar^2)$ is in a range of 25 mol % to 65 mol %, $$—O—Ar^1—O—\underset{O}{\overset{\parallel}{C}}— \quad (1)$$

$$—O—Ar^2—O—\underset{O}{\overset{\parallel}{C}}— \quad (2)$$

where: $Ar^1$ is a group represented by a formula (3) below and $Ar^2$ is a group represented by a formula (4) below, (3) [structure with $(R^1)_{p1}$ and $(R^2)_{p2}$ on two aromatic rings joined by O]

(4) [structure with $(R^3)_{p3}$ and $(R^4)_{p4}$ on two aromatic rings joined by C with $R^5$, $R^6$]

where:
each $R^1$, $R^2$, $R^3$, and $R^4$ is independently selected from the group consisting of a fluoroalkyl group having 1 to 5 carbon atoms, an alkyl group having 1 to 5 carbon atoms, and an alkoxy group having 1 to 5 carbon atoms;
$R^5$ and $R^6$ are independently selected from a group consisting of a hydrogen atom and an alkyl group having 1 to 2 carbon atoms;
$p_1$, $p_2$, $p_3$, and $p_4$ each are an integer of 0 to 4;
each $R^1$, $R^2$, $R^3$, and $R^4$ is mutually the same or different, when an aromatic ring is substituted by two or more of $R^1$, $R^2$, $R^3$, and $R^4$ ($p_1$, $p_2$, $p_3$, and $p_4 \geq 2$); and
$R^5$ and $R^6$ are mutually different.

2. The polycarbonate copolymer according to claim 1, wherein a chain end of each of the repeating units represented by the formulae (1) and (2) is terminated by a monovalent aromatic group or a monovalent fluorine-containing aliphatic group.

3. The polycarbonate polymer according to claim 1, wherein the polycarbonate copolymer is made from a bischloroformate oligomer represented by formulae (13) and (14) below, wherein a bischloroformate oligomer has an average number of monomer units (n) in a range of 1.0 to 1.99, $$Cl—\underset{O}{\overset{\parallel}{C}}{\left(O—Ar^1—O—\underset{O}{\overset{\parallel}{C}}\right)}_n Cl \quad (13)$$

$$Cl—\underset{O}{\overset{\parallel}{C}}{\left(O—Ar^2—O—\underset{O}{\overset{\parallel}{C}}\right)}_n Cl. \quad (14)$$

4. The polycarbonate copolymer according to claim 1, wherein the $Ar^2$ group represented by the formula (4) is a divalent group derived from 2,2-bis(4-hydroxyphenyl)butane.

5. A coating liquid comprising the polycarbonate copolymer according to claim 1 and an organic solvent.

6. An electrophotographic photoreceptor comprising:
a conductive substrate;
and a photosensitive layer on the conductive substrate,
wherein the photosensitive layer comprises the polycarbonate copolymer according to claim 1 as a component.

7. The polycarbonate copolymer according to claim 2, wherein a chain end of each of the repeating units represented by the formulae (1) and (2) is terminated by a monovalent aromatic group.

8. The polycarbonate copolymer according to claim 7, wherein the monovalent aromatic group is an aryl group having 6 to 12 carbon atoms.

9. The polycarbonate copolymer according to claim 1, wherein a chain end of each of the repeating units represented by the formulae (1) and (2) is terminated by a monovalent organic siloxane modified phenyl group represented by formula (9):

$$R^{41}{\left(\underset{R^{47}}{\overset{R^{46}}{\underset{|}{\overset{|}{Si}}}}—O\right)}_n \underset{R^{49}}{\overset{R^{48}}{\underset{|}{\overset{|}{Si}}}}—Z— \text{[aromatic ring with } R^{42}, R^{43}, R^{44}, R^{45}] \quad (9)$$

where:
Z represents a hydrocarbon group having 2 to 6 carbon atoms;
$R^{41}$ represents an aliphatic hydrocarbon group having 1 to 6 carbon atoms;
$R^{42}$ to $R^{45}$ each independently represent hydrogen, a substituted or unsubstituted alkyl group having 1 to 12 carbon atoms, a substituted or unsubstituted alkoxy group having 1 to 12 carbon atoms and a substituted or unsubstituted aryl group having 6 to 12 ring carbon atoms;
$R^{46}$ to $R^{49}$ each independently represent a substituted or unsubstituted alkyl group having 1 to 12 carbon atoms and a substituted or unsubstituted aryl group having 6 to 12 ring carbon atoms; and
n is an integer of 2 to 600.

10. The polycarbonate copolymer according to claim 1, wherein $Ar^1/(Ar^1+Ar^2)$ is in a range of 40 mol % to 75 mol %.

11. The polycarbonate copolymer according to claim 1, wherein $Ar^2/(Ar^1+Ar^2)$ is in a range of 25 mol % to 60 mol %.

12. The polycarbonate copolymer according to claim 1, wherein in the formulae (3) and (4), the alkyl group having 1 to 5 carbon atoms for $R^1$ to $R^4$ is selected from the group consisting of a methyl group, an ethyl group, propyl groups, butyl groups, pentyl groups and a cyclopentyl group.

13. The polycarbonate copolymer according to claim 1, wherein in the formulae (3) and (4), the fluoroalkyl group having 1 to 5 carbon atoms for $R^1$ to $R^4$ is a group obtained by substituting the alkyl group having 1 to 5 carbon atoms with one or more fluorine atoms.

14. The polycarbonate copolymer according to claim 1, wherein in the formulae (3) and (4), the alkoxy group having 1 to 5 carbon atoms for $R^1$ to $R^4$ is a methoxy group or an ethoxy group.

15. The polycarbonate copolymer according to claim 1, wherein the alkyl group having 1 to 2 carbon atoms for $R^5$ to $R^6$ is a methyl group or an ethyl group.

16. The polycarbonate copolymer according to claim 1, wherein in the formulae (3) and (4):
the alkyl group having 1 to 5 carbon atoms for $R^1$ to $R^4$ is selected from the group consisting of a methyl group, an ethyl group, propyl groups, butyl groups, pentyl groups and a cyclopentyl group;
the fluoroalkyl group having 1 to 5 carbon atoms for $R^1$ to $R^4$ is a group obtained by substituting the alkyl group having 1 to 5 carbon atoms with one or more fluorine atoms;
the alkoxy group having 1 to 5 carbon atoms for $R^1$ to $R^4$ is a methoxy group or an ethoxy group; and
the alkyl group having 1 to 2 carbon atoms for $R^5$ to $R^6$ is a methyl group or an ethyl group.

17. The polycarbonate copolymer according to claim 1, wherein the polycarbonate copolymer is represented by formula (10):

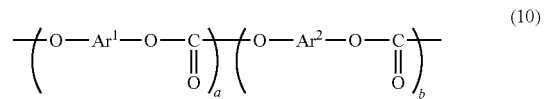

where:
a is 0.35 to 0.75, and
b is 0.25 to 0.65.

* * * * *